(12) United States Patent
Fleming et al.

(10) Patent No.: US 8,006,760 B2
(45) Date of Patent: Aug. 30, 2011

(54) CLEAN FLUID SYSTEMS FOR PARTIAL MONOLAYER FRACTURING

(75) Inventors: Jeff T. Fleming, Duncan, OK (US); Richard W. Pauls, Duncan, OK (US); Thomas D. Welton, Duncan, OK (US); David E. McMechan, Duncan, OK (US); Bradley L. Todd, Duncan, OK (US); Jason Bryant, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 72 days.

(21) Appl. No.: 12/101,099

(22) Filed: Apr. 10, 2008

(65) Prior Publication Data

US 2009/0255668 A1 Oct. 15, 2009

(51) Int. Cl.
*E21B 43/267* (2006.01)
(52) U.S. Cl. .................................. 166/280.2; 166/282
(58) Field of Classification Search ............... 166/280.1, 166/280.2, 279, 282, 275, 304
See application file for complete search history.

(56) References Cited

U.S. PATENT DOCUMENTS

| | | | |
|---|---|---|---|
| 2,238,671 A | 4/1941 | Woodhouse |
| 2,703,316 A | 3/1955 | Palmer |
| 3,026,938 A | 3/1962 | Huitt et al. |
| 3,149,673 A | 9/1964 | Pennington |
| 3,149,674 A | 9/1964 | Schutze et al. |
| 3,173,484 A | 3/1965 | Huitt et al. |
| 3,175,615 A | 3/1965 | East et al. |
| 3,195,635 A | 7/1965 | Fast |
| 3,217,801 A | 11/1965 | Fast et al. |
| 3,254,717 A | 6/1966 | Huitt et al. |
| 3,266,573 A | 8/1966 | Rixe |
| 3,272,650 A | 9/1966 | MacVittie |
| 3,302,719 A | 2/1967 | Fischer |
| 3,323,594 A | 6/1967 | Huitt et al. |
| 3,364,995 A | 1/1968 | Atkins et al. |
| 3,366,178 A | 1/1968 | Malone et al. |
| 3,455,390 A | 7/1969 | Gallus |
| 3,659,651 A | 5/1972 | Graham |
| 3,784,585 A | 1/1974 | Schmitt et al. |
| 3,819,525 A | 6/1974 | Hattenbrun |
| 3,828,854 A | 8/1974 | Templeton et al. |
| 3,836,465 A | 9/1974 | Rhudy et al. |
| 3,868,998 A | 3/1975 | Lybarger et al. |
| 3,912,692 A | 10/1975 | Casey et al. |

(Continued)

FOREIGN PATENT DOCUMENTS

EP 0 510 762 10/1992

(Continued)

OTHER PUBLICATIONS

Office Action for U.S. Appl. No. 12/101,103, dated Mar. 23, 2009.

(Continued)

*Primary Examiner* — Kenneth Thompson
(74) *Attorney, Agent, or Firm* — Robert A. Kent; McDermott Will & Emery LLP

(57) ABSTRACT

Provided are methods that include a method comprising: placing a clean fluid comprising proppant particulates into a portion of a fracture in a subterranean formation, and depositing one or more of the proppant particulates into the fracture to form a partial monolayer. In another aspect, the invention provides methods that include placing a degradable fluid loss additive comprising collagen into a subterranean formation.

22 Claims, 5 Drawing Sheets

U.S. PATENT DOCUMENTS

| | | | |
|---|---|---|---|
| 3,948,672 | A | 4/1976 | Harnsberger |
| 3,955,993 | A | 5/1976 | Curtice |
| 3,960,736 | A | 6/1976 | Free et al. |
| 3,968,840 | A | 7/1976 | Tate |
| 3,986,355 | A | 10/1976 | Klaeger |
| 3,998,272 | A | 12/1976 | Maly |
| 3,998,744 | A | 12/1976 | Arnold et al. |
| 4,010,071 | A | 3/1977 | Colegrove |
| 4,068,718 | A | 1/1978 | Cooke, Jr. et al. |
| 4,169,798 | A | 10/1979 | DeMartino |
| 4,172,066 | A | 10/1979 | Zweigle et al. |
| 4,261,421 | A | 4/1981 | Watanabe |
| 4,265,673 | A | 5/1981 | Pace et al. |
| 4,267,887 | A | 5/1981 | Watanabe |
| 4,282,928 | A | 8/1981 | McDonald et al. |
| 4,299,825 | A | 11/1981 | Lee |
| 4,363,736 | A | 12/1982 | Block |
| 4,387,769 | A | 6/1983 | Erbstoesser et al. |
| 4,460,052 | A | 7/1984 | Gockel |
| 4,460,751 | A | 7/1984 | Hanlon et al. |
| 4,470,915 | A | 9/1984 | Conway |
| 4,498,995 | A | 2/1985 | Gockel |
| 4,502,540 | A | 3/1985 | Byham |
| 4,506,734 | A | 3/1985 | Nolte |
| 4,521,316 | A | 6/1985 | Sikorski |
| 4,526,695 | A | 7/1985 | Erbstoesser et al. |
| 4,632,876 | A | 12/1986 | Laird et al. |
| 4,694,905 | A | 9/1987 | Armbruster |
| 4,715,967 | A | 12/1987 | Bellis |
| 4,716,964 | A | 1/1988 | Erbstoesser et al. |
| 4,767,706 | A | 8/1988 | Levesque |
| 4,772,346 | A | 9/1988 | Anderson et al. |
| 4,785,884 | A | 11/1988 | Armbruster |
| 4,793,416 | A | 12/1988 | Mitchell |
| 4,797,216 | A | 1/1989 | Hodge |
| 4,797,262 | A | 1/1989 | Dewitz |
| 4,809,782 | A | 3/1989 | Shu |
| 4,809,783 | A | 3/1989 | Hollenbeck et al. |
| 4,817,721 | A | 4/1989 | Pober |
| 4,822,500 | A | 4/1989 | Dobson, Jr. et al. |
| 4,829,100 | A | 5/1989 | Murphey et al. |
| 4,834,182 | A | 5/1989 | Shu |
| 4,836,940 | A | 6/1989 | Alexander |
| 4,843,118 | A | 6/1989 | Lai et al. |
| 4,848,467 | A | 7/1989 | Cantu et al. |
| 4,863,980 | A | 9/1989 | Cowan et al. |
| 4,871,021 | A | 10/1989 | Shu |
| 4,886,354 | A | 12/1989 | Welch et al. |
| 4,894,231 | A | 1/1990 | Moreau et al. |
| 4,909,324 | A | 3/1990 | Shu |
| 4,957,165 | A | 9/1990 | Cantu et al. |
| 4,961,466 | A | 10/1990 | Himes et al. |
| 4,980,393 | A | 12/1990 | Shu |
| 4,986,353 | A | 1/1991 | Clark et al. |
| 4,986,354 | A | 1/1991 | Cantu et al. |
| 4,986,355 | A | 1/1991 | Casad et al. |
| 5,034,139 | A | 7/1991 | Reid et al. |
| 5,082,056 | A | 1/1992 | Tackett, Jr. |
| 5,142,023 | A | 8/1992 | Gruber et al. |
| 5,152,781 | A | 10/1992 | Tang et al. |
| 5,161,615 | A | 11/1992 | Hutchins et al. |
| 5,203,834 | A | 4/1993 | Hutchins et al. |
| 5,213,446 | A | 5/1993 | Dovan |
| 5,216,050 | A | 6/1993 | Sinclair |
| 5,247,059 | A | 9/1993 | Gruber et al. |
| 5,249,628 | A | 10/1993 | Surjaatmadja |
| 5,251,697 | A | 10/1993 | Shuler |
| 5,295,542 | A | 3/1994 | Cole et al. |
| 5,304,620 | A | 4/1994 | Holtmyer et al. |
| 5,307,874 | A | 5/1994 | Lowther |
| 5,314,031 | A | 5/1994 | Hale et al. |
| 5,325,923 | A | 7/1994 | Surjaatmadja et al. |
| 5,330,005 | A | 7/1994 | Card et al. |
| 5,359,026 | A | 10/1994 | Gruber |
| 5,360,068 | A | 11/1994 | Sprunt et al. |
| 5,363,916 | A | 11/1994 | Himes et al. |
| 5,373,901 | A | 12/1994 | Norman et al. |
| 5,386,874 | A | 2/1995 | Laramay et al. |
| 5,396,957 | A | 3/1995 | Surjaatmadja et al. |
| 5,402,846 | A | 4/1995 | Jennings, Jr. et al. |
| 5,439,055 | A | 8/1995 | Card et al. |
| 5,439,057 | A | 8/1995 | Weaver et al. |
| 5,460,226 | A | 10/1995 | Lawton et al. |
| 5,464,060 | A | 11/1995 | Hale et al. |
| 5,475,080 | A | 12/1995 | Gruber et al. |
| 5,484,881 | A | 1/1996 | Gruber et al. |
| 5,487,897 | A | 1/1996 | Polson et al. |
| 5,492,177 | A | 2/1996 | Yeh et al. |
| 5,496,557 | A | 3/1996 | Feijen et al. |
| 5,497,830 | A | 3/1996 | Boles et al. |
| 5,499,678 | A | 3/1996 | Surjaatmadja et al. |
| 5,501,276 | A | 3/1996 | Weaver et al. |
| 5,505,787 | A | 4/1996 | Yamaguchi |
| 5,512,071 | A | 4/1996 | Yam et al. |
| 5,531,274 | A | 7/1996 | Bienvenu, Jr. |
| 5,536,807 | A | 7/1996 | Gruber et al. |
| 5,555,936 | A | 9/1996 | Pirri et al. |
| 5,558,161 | A * | 9/1996 | Vitthal et al. ............... 166/280.1 |
| 5,591,700 | A | 1/1997 | Harris et al. |
| 5,594,095 | A | 1/1997 | Gruber et al. |
| 5,602,083 | A | 2/1997 | Gabrysch et al. |
| 5,604,186 | A | 2/1997 | Hunt et al. |
| 5,607,905 | A | 3/1997 | Dobson, Jr. et al. |
| 5,613,558 | A | 3/1997 | Dillenbeck |
| 5,670,473 | A | 9/1997 | Scepanski |
| 5,680,900 | A | 10/1997 | Nguyen et al. |
| 5,697,440 | A | 12/1997 | Weaver et al. |
| 5,698,322 | A | 12/1997 | Tsai et al. |
| 5,723,416 | A | 3/1998 | Liao |
| 5,765,642 | A | 6/1998 | Surjaatmadja |
| 5,783,527 | A | 7/1998 | Dobson, Jr. et al. |
| 5,791,415 | A | 8/1998 | Nguyen et al. |
| 5,799,734 | A | 9/1998 | Norman et al. |
| 5,833,000 | A | 11/1998 | Weaver et al. |
| 5,839,510 | A | 11/1998 | Weaver et al. |
| 5,849,401 | A | 12/1998 | El-Afandi et al. |
| 5,853,048 | A | 12/1998 | Weaver et al. |
| 5,888,944 | A | 3/1999 | Patel |
| 5,893,416 | A | 4/1999 | Read |
| 5,908,073 | A | 6/1999 | Nguyen et al. |
| 5,916,849 | A | 6/1999 | House |
| 5,924,488 | A | 7/1999 | Nguyen et al. |
| 5,964,291 | A | 10/1999 | Bourne et al. |
| 5,977,030 | A | 11/1999 | House |
| 5,979,557 | A | 11/1999 | Card et al. |
| 5,990,051 | A | 11/1999 | Ischy et al. |
| 5,996,693 | A | 12/1999 | Heathman |
| 6,004,400 | A | 12/1999 | Bishop et al. |
| 6,024,170 | A | 2/2000 | McCabe et al. |
| 6,028,113 | A | 2/2000 | Scepanski |
| 6,047,772 | A | 4/2000 | Weaver et al. |
| 6,072,101 | A | 6/2000 | Beihoffer et al. |
| 6,110,875 | A | 8/2000 | Tjon-Joe-Pin et al. |
| 6,114,410 | A * | 9/2000 | Betzold ........................ 523/130 |
| 6,123,159 | A | 9/2000 | Brookey et al. |
| 6,123,965 | A | 9/2000 | Jacob et al. |
| 6,131,661 | A | 10/2000 | Conner et al. |
| 6,135,987 | A | 10/2000 | Tsai et al. |
| 6,143,698 | A | 11/2000 | Murphey et al. |
| 6,148,917 | A | 11/2000 | Brookey et al. |
| 6,162,766 | A | 12/2000 | Muir et al. |
| 6,169,058 | B1 | 1/2001 | Le et al. |
| 6,172,011 | B1 | 1/2001 | Card et al. |
| 6,189,615 | B1 | 2/2001 | Sydansk |
| 6,202,751 | B1 | 3/2001 | Chatterji et al. |
| 6,209,643 | B1 | 4/2001 | Nguyen et al. |
| 6,209,646 | B1 | 4/2001 | Reddy et al. |
| 6,214,773 | B1 | 4/2001 | Harris et al. |
| 6,242,390 | B1 | 6/2001 | Mitchell et al. |
| 6,257,335 | B1 | 7/2001 | Nguyen et al. |
| 6,260,622 | B1 | 7/2001 | Blok et al. |
| 6,291,013 | B1 | 9/2001 | Gibson et al. |
| 6,300,286 | B1 | 10/2001 | Dobson, Jr. et al. |
| 6,302,209 | B1 | 10/2001 | Thompson et al. |
| 6,308,788 | B1 | 10/2001 | Patel et al. |
| 6,311,773 | B1 | 11/2001 | Todd et al. |
| 6,323,307 | B1 | 11/2001 | Bigg et al. |

| Patent No. | Date | Inventor |
|---|---|---|
| 6,326,458 B1 | 12/2001 | Gruber et al. |
| 6,328,105 B1 | 12/2001 | Betzold |
| 6,330,917 B2 | 12/2001 | Chatterji et al. |
| 6,357,527 B1 | 3/2002 | Norman et al. |
| 6,364,945 B1 | 4/2002 | Chatterji et al. |
| 6,380,138 B1 | 4/2002 | Ischy et al. |
| 6,387,986 B1 | 5/2002 | Moradi-Araghi et al. |
| 6,390,195 B1 | 5/2002 | Nguyen et al. |
| 6,394,185 B1 | 5/2002 | Constien |
| 6,406,789 B1 | 6/2002 | McDaniel et al. |
| 6,422,314 B1 | 7/2002 | Todd et al. |
| 6,422,326 B1 | 7/2002 | Brookey et al. |
| 6,432,155 B1 | 8/2002 | Swazey et al. |
| 6,439,309 B1 | 8/2002 | Matherly et al. |
| 6,454,003 B1 | 9/2002 | Chang et al. |
| 6,485,947 B1 | 11/2002 | Rajgarhia et al. |
| 6,488,091 B1 | 12/2002 | Weaver et al. |
| 6,488,763 B2 | 12/2002 | Brothers et al. |
| 6,494,263 B2 | 12/2002 | Todd |
| 6,508,305 B1 | 1/2003 | Brannon et al. |
| 6,509,301 B1 | 1/2003 | Vollmer et al. |
| 6,527,051 B1 | 3/2003 | Reddy et al. |
| 6,554,071 B1 | 4/2003 | Reddy et al. |
| 6,566,310 B2 | 5/2003 | Chan |
| 6,569,814 B1 | 5/2003 | Brady et al. |
| 6,578,630 B2 | 6/2003 | Simpson et al. |
| 6,599,863 B1 | 7/2003 | Palmer et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,702,023 B1 | 3/2004 | Harris et al. |
| 6,710,019 B1 | 3/2004 | Sawdon et al. |
| 6,716,797 B2 | 4/2004 | Brookey |
| 6,737,385 B2 | 5/2004 | Todd et al. |
| 6,761,218 B2 | 7/2004 | Nguyen et al. |
| 6,763,888 B1 | 7/2004 | Harris et al. |
| 6,764,981 B1 | 7/2004 | Eoff et al. |
| 6,793,018 B2 | 9/2004 | Dawson et al. |
| 6,793,730 B2 | 9/2004 | Reddy et al. |
| 6,806,235 B1 | 10/2004 | Mueller et al. |
| 6,817,414 B2 | 11/2004 | Lee |
| 6,818,594 B1 | 11/2004 | Freeman et al. |
| 6,837,309 B2 | 1/2005 | Boney et al. |
| 6,840,318 B2 | 1/2005 | Lee et al. |
| 6,852,173 B2 | 2/2005 | Banerjee et al. |
| 6,861,394 B2 | 3/2005 | Ballard et al. |
| 6,877,563 B2 | 4/2005 | Todd et al. |
| 6,883,608 B2 | 4/2005 | Parlar et al. |
| 6,886,635 B2 | 5/2005 | Hossaini et al. |
| 6,896,058 B2 | 5/2005 | Munoz, Jr. et al. |
| 6,904,971 B2 | 6/2005 | Brothers et al. |
| 6,913,080 B2 | 7/2005 | Lehman et al. |
| 6,949,491 B2 | 9/2005 | Cooke, Jr. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,000,701 B2 | 2/2006 | Todd et al. |
| 7,000,702 B2 | 2/2006 | Hanes, Jr. et al. |
| 7,001,872 B2 | 2/2006 | Pyecroft et al. |
| 7,004,255 B2 * | 2/2006 | Boney .................. 166/280.2 |
| 7,007,752 B2 | 3/2006 | Reddy et al. |
| 7,021,337 B2 | 4/2006 | Markham |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,063,151 B2 | 6/2006 | Nguyen et al. |
| 7,066,258 B2 | 6/2006 | Justus et al. |
| 7,066,260 B2 | 6/2006 | Sullivan et al. |
| 7,069,994 B2 | 7/2006 | Cooke, Jr. |
| 7,080,688 B2 | 7/2006 | Todd et al. |
| 7,082,995 B2 | 8/2006 | Hanes, Jr. et al. |
| 7,093,658 B2 | 8/2006 | Chatterji et al. |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,132,389 B2 | 11/2006 | Lee |
| 7,140,438 B2 | 11/2006 | Frost et al. |
| 7,147,067 B2 | 12/2006 | Getzalf et al. |
| 7,151,077 B2 | 12/2006 | Prud'homme et al. |
| 7,153,902 B2 | 12/2006 | Altes et al. |
| 7,156,174 B2 | 1/2007 | Roddy et al. |
| 7,165,617 B2 | 1/2007 | Lord et al. |
| 7,166,560 B2 | 1/2007 | Still et al. |
| 7,168,489 B2 | 1/2007 | Frost et al. |
| 7,168,490 B2 | 1/2007 | Taylor et al. |
| 7,172,022 B2 | 2/2007 | Reddy et al. |
| 7,178,596 B2 | 2/2007 | Blauch et al. |
| 7,195,068 B2 | 3/2007 | Todd |
| 7,204,311 B2 | 4/2007 | Welton et al. |
| 7,204,312 B2 | 4/2007 | Roddy et al. |
| 7,205,264 B2 | 4/2007 | Boles |
| 7,210,528 B1 | 5/2007 | Brannon et |
| 7,216,705 B2 | 5/2007 | Saini et al. |
| 7,219,731 B2 | 5/2007 | Sullivan |
| 7,228,904 B2 | 6/2007 | Todd et al. |
| 7,240,732 B2 | 7/2007 | Lewis et al. |
| 7,255,169 B2 | 8/2007 | van Batenburg et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,265,079 B2 | 9/2007 | Wilbert et al. |
| 7,267,170 B2 | 9/2007 | Mang et al. |
| 7,276,466 B2 | 10/2007 | Todd et al. |
| 7,281,580 B2 | 10/2007 | Parker et al. |
| 7,293,611 B2 | 11/2007 | Taylor et al. |
| 7,299,869 B2 | 11/2007 | Kalman |
| 7,303,014 B2 | 12/2007 | Reddy et al. |
| 7,306,037 B2 | 12/2007 | Nguyen et al. |
| 7,311,145 B2 | 12/2007 | Lehman et al. |
| 7,322,411 B2 * | 1/2008 | Brannon et al. ............ 166/280.2 |
| 7,322,412 B2 | 1/2008 | Badalamenti et al. |
| 7,328,744 B2 | 2/2008 | Taylor et al. |
| 7,331,389 B2 | 2/2008 | Lehman et al. |
| 7,392,842 B2 | 7/2008 | Morgan et al. |
| 7,445,044 B2 | 11/2008 | Walters et al. |
| 7,645,725 B2 | 1/2010 | Weaver et al. |
| 7,727,937 B2 | 6/2010 | Pauls et al. |
| 7,814,980 B2 | 10/2010 | Bryant et al. |
| 7,902,128 B2 | 3/2011 | Zhang et al. |
| 7,910,524 B2 | 3/2011 | Welton et al. |
| 2001/0016562 A1 | 8/2001 | Muir et al. |
| 2002/0119169 A1 | 8/2002 | Angel et al. |
| 2003/0050758 A1 * | 3/2003 | Soliman et al. .................. 702/6 |
| 2003/0054962 A1 | 3/2003 | England et al. |
| 2003/0130133 A1 | 7/2003 | Vollmer |
| 2003/0147965 A1 | 8/2003 | Basset et al. |
| 2003/0230407 A1 | 12/2003 | Vijn et al. |
| 2004/0014606 A1 | 1/2004 | Parlar et al. |
| 2004/0040708 A1 * | 3/2004 | Stephenson et al. ....... 166/280.1 |
| 2004/0070093 A1 | 4/2004 | Mathiowitz et al. |
| 2004/0099416 A1 | 5/2004 | Vijn et al. |
| 2004/0138068 A1 | 7/2004 | Rimmer et al. |
| 2004/0152601 A1 | 8/2004 | Still et al. |
| 2004/0170836 A1 | 9/2004 | Bond et al. |
| 2004/0231845 A1 | 11/2004 | Cooke, Jr. |
| 2004/0259738 A1 | 12/2004 | Patel |
| 2005/0028976 A1 | 2/2005 | Nguyen |
| 2005/0034861 A1 | 2/2005 | Saini et al. |
| 2005/0034868 A1 * | 2/2005 | Frost et al. .................... 166/307 |
| 2005/0059556 A1 | 3/2005 | Munoz, Jr. et al. |
| 2005/0059557 A1 | 3/2005 | Todd et al. |
| 2005/0059558 A1 | 3/2005 | Blauch et al. |
| 2005/0126785 A1 | 6/2005 | Todd et al. |
| 2005/0130848 A1 | 6/2005 | Todd et al. |
| 2005/0137094 A1 | 6/2005 | Weaver et al. |
| 2005/0183741 A1 | 8/2005 | Surjaatmadja et al. |
| 2005/0187114 A1 | 8/2005 | Lehman et al. |
| 2005/0205266 A1 | 9/2005 | Todd et al. |
| 2005/0267001 A1 | 12/2005 | Weaver et al. |

| | | | |
|---|---|---|---|
| 2005/0272613 A1 | 12/2005 | Cooke, Jr. | |
| 2005/0274517 A1 | 12/2005 | Blauch et al. | |
| 2005/0277554 A1 | 12/2005 | Blauch et al. | |
| 2006/0014648 A1* | 1/2006 | Milson et al. | 507/213 |
| 2006/0016596 A1 | 1/2006 | Pauls et al. | |
| 2006/0032633 A1 | 2/2006 | Nguyen | |
| 2006/0046938 A1 | 3/2006 | Harris et al. | |
| 2006/0048943 A1 | 3/2006 | Parker et al. | |
| 2006/0065396 A1 | 3/2006 | Dawson et al. | |
| 2006/0065397 A1 | 3/2006 | Nguyen et al. | |
| 2006/0105917 A1 | 5/2006 | Munoz, Jr. et al. | |
| 2006/0105918 A1 | 5/2006 | Munoz, Jr. et al. | |
| 2006/0108150 A1 | 5/2006 | Luke et al. | |
| 2006/0113078 A1 | 6/2006 | Nguyen et al. | |
| 2006/0113080 A1 | 6/2006 | Nguyen et al. | |
| 2006/0118300 A1 | 6/2006 | Welton et al. | |
| 2006/0151170 A1 | 7/2006 | Brannon et al. | |
| 2006/0157243 A1 | 7/2006 | Nguyen | |
| 2006/0166834 A1 | 7/2006 | Roddy | |
| 2006/0169182 A1 | 8/2006 | Todd et al. | |
| 2006/0169448 A1 | 8/2006 | Savery et al. | |
| 2006/0169450 A1 | 8/2006 | Mang et al. | |
| 2006/0169451 A1* | 8/2006 | Savery et al. | |
| 2006/0172891 A1* | 8/2006 | Gewehr et al. | |
| 2006/0172894 A1* | 8/2006 | Mang et al. | |
| 2006/0172895 A1* | 8/2006 | Mang et al. | |
| 2006/0175058 A1* | 8/2006 | Nguyen | |
| 2006/0175059 A1* | 8/2006 | Sinclair et al. | 166/283 |
| 2006/0185848 A1* | 8/2006 | Surjaatmadja et al. | |
| 2006/0196662 A1 | 9/2006 | Hanes et al. | |
| 2006/0234873 A1* | 10/2006 | Ballard | |
| 2006/0258543 A1* | 11/2006 | Saini | |
| 2006/0258544 A1* | 11/2006 | Saini | |
| 2006/0276345 A1* | 12/2006 | Todd et al. | |
| 2006/0283597 A1* | 12/2006 | Schreiner et al. | |
| 2007/0062702 A1 | 3/2007 | Walters et al. | |
| 2007/0062703 A1 | 3/2007 | Walters et al. | |
| 2007/0079961 A1 | 4/2007 | Morgan et al. | |
| 2007/0100029 A1* | 5/2007 | Reddy et al. | |
| 2007/0125536 A1* | 6/2007 | Acock et al. | |
| 2007/0181302 A1* | 8/2007 | Bicerano | |
| 2007/0193745 A1* | 8/2007 | Fulton et al. | |
| 2007/0235190 A1* | 10/2007 | Lord et al. | |
| 2007/0244014 A1 | 10/2007 | Weaver et al. | |
| 2007/0256836 A1* | 11/2007 | Welton et al. | |
| 2007/0281868 A1 | 12/2007 | Pauls et al. | |
| 2007/0298977 A1* | 12/2007 | Mang et al. | |
| 2008/0009423 A1* | 1/2008 | Mang et al. | |
| 2008/0035342 A1* | 2/2008 | Saini et al. | 166/279 |
| 2008/0039347 A1 | 2/2008 | Welton et al. | |
| 2008/0135247 A1 | 6/2008 | Hutchins | |
| 2008/0194427 A1 | 8/2008 | Welton et al. | |
| 2008/0194428 A1 | 8/2008 | Welton et al. | |
| 2008/0194430 A1 | 8/2008 | Welton et al. | |
| 2009/0270280 A1 | 10/2009 | Zhang et al. | |

FOREIGN PATENT DOCUMENTS

| | | | |
|---|---|---|---|
| EP | 0 879 935 | | 11/1998 |
| EP | 1 086 976 A1 | | 3/2001 |
| EP | 1 413 710 | | 4/2004 |
| GB | 2 412 389 | | 3/2004 |
| GB | 2412390 A | | 9/2005 |
| WO | WO 93/15127 | * | 8/1993 |
| WO | WO 94/07949 | | 4/1994 |
| WO | WO 94/08078 | | 4/1994 |
| WO | WO 94/08090 | | 4/1994 |
| WO | WO 95/09879 | | 4/1995 |
| WO | WO 97/11845 | | 4/1997 |
| WO | WO 99/27229 | | 6/1999 |
| WO | WO 00/05302 | | 2/2000 |
| WO | WO 00/57022 | | 9/2000 |
| WO | WO 01/02698 | | 1/2001 |
| WO | WO 01/64897 | | 9/2001 |
| WO | WO 01/87797 | | 11/2001 |
| WO | WO 01/94744 | | 12/2001 |
| WO | WO 02/55843 | | 1/2002 |
| WO | WO 02/12674 | | 2/2002 |
| WO | WO 03/027431 | | 4/2003 |
| WO | WO 2004/007905 | | 1/2004 |
| WO | WO 2004/037946 | | 5/2004 |
| WO | WO 2004/038176 | | 5/2004 |

OTHER PUBLICATIONS

U.S. Appl. No. 11/704,009, filed Feb. 8, 2007, Welton, et al.*
U.S. Appl. No. 11/704,121, filed Feb. 8, 2007, Welton, et al.*
U.S. Appl. No. 11/704,598, filed Feb. 8, 2007, Welton, et al.*
U.S. Appl. No. 11/867,082, filed Oct. 4, 2007, Parker, et al.*
U.S. Appl. No. 12/101,103, filed Apr. 10, 2008, Bryant, et al.*
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level I Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
Y. Chiang et al., *Hydrolysis of Ortho Esters; Further Investigation of the Factors Which Control the Rate-Determining Step*, Engineering Information, Inc. NY, NY, vol. 105, No. 23 (XP-002322842).
M. Ahmad, et al., *Ortho Ester Hydrolysis: Direct Evidence for a Three-Stage Reaction Mechanism*, Engineering Information, Inc. NY, NY, vol. 101, No. 10 (XP-002322843).
Skrabal et al, *The Hydrolysis Rate of Orthoformic Acid Ethyl Ether*, Chemical Institute of the University of Graz, Jan. 13, 1921, pp. 1-38.
Heller, et al., *Poly(ortho esters)—From Concept to Reality*, Biomacromolecules, vol. 5, No. 5, 2004 (pp. 1625-1632).
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development of a Poly(ortho ester) prototype With a Latent Acid in the Polymer Backbone for 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) for the Pulsed and Continuous Delivery of Peptides and Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications*, Society of Petroleum Engineers, Inc., SPE 92709.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

Darin, S.R. and Huitt, J.R., Effect of a Partial Monolayer of Proppant on Fracture Flow Capacity, SPE 1291-G, presented at the SPE Annual Fall Meeting held in Dallas, TX, Oct. 4-7, 1959.

Anderson et al. "Chapter 6: Propping Agents and Fracture Conductivity." In Gidley, J. L., et al. (ed.), *Recent Advances in Hydraulic Fracturing*, Society of Petroleum Engineers, Richardson, Tex.

Posey et al. "The Effect of Using a Lightweight Proppant in Treatment of a Low-Permeability, Dry Gas Reservoir: A Case Study" SPE 97998, presented Sep. 14-16, 2005.

NSI brochure entitled "StimPlan Info".

Myers et al. "Field Application of New Lightweight Proppant in Appalachian Tight Gas Sandstones" SPE 91469, presented Sep. 15-17, 2004.

Parker et al. "High-Porosity Fractures Yield High Conductivity" SPE 96848, presented Oct. 9-12, 2005.

Schein et al. "Ultra Lightweight Proppants: Their Use and Application in the Barnett Shale" SPE 90838, presented Sep. 26-29, 2004.

Halliburton presentation entitled "Hydraulic Fracturing Technology, High Porosity Fracturing, FDP-S729-04" dated 2004.

Core Laboratories brochure entitled "GOHFER® Fracture Stimulation Design" dated 2005.

Halliburton brochure entitled "AF-61™ Emulsifier" dated 2008.

Pinnacle Technologies brochure entitled "FracproPT™" dated 2007.

International Search Report and Written Opinion for PCT/GB2009/000906, dated Oct. 30, 2009.

Office Action for U.S. Appl. No. 12/101,103 dated Apr. 21, 2010.

Notice of Allowance for U.S. Appl. No. 12/101,103 dated Jun. 8, 2010.

Notice of Allowance for U.S. Appl. No. 12/101,103 dated Jul. 26, 2010.

International Preliminary Report on Patentability for PCT/GB2009/000906 dated Oct. 21, 2010.

International Search Report and Written Opinion for PCT/GB2009/000844 dated Jul. 6, 2009.

Cl-29™ Crosslinker Product Data Sheet, 2008.

Borate Crosslinked Fluids Product Information at http://www.halliburton.com, Mar. 19, 2008.

N-VIS™ Product Data Sheet, Sep. 5, 2006.

\* cited by examiner

CLEAN FLUID SYSTEMS FOR PARTIAL MONOLAYER FRACTURING

BACKGROUND

The present invention relates to subterranean formation stimulation, and, at least in some embodiments, to novel methods for partial monolayer fracturing ("PMF").

Subterranean wells (such as hydrocarbon producing wells, water producing wells, and injection wells) are often stimulated by traditional hydraulic fracturing treatments. In some traditional hydraulic fracturing treatments, a low viscosity fluid is pumped into a portion of a subterranean formation at sufficiently high rates to fracture the formation. The pressure required to induce fractures in rock at a given depth is known as the "fracture gradient." In other traditional hydraulic fracturing treatments, a viscous fracturing fluid, which also may function as a carrier fluid, is pumped into a portion of a subterranean formation at a rate and pressure such that the subterranean formation breaks down and one or more fractures are formed. Particulate solids, such as graded sand, may be suspended in a portion of the fracturing or carrier fluid and then deposited in the fractures. These particulate solids, or "proppant particulates," serve to prevent the fractures from fully closing once the hydraulic pressure is released. By preventing the fracture from fully closing, the proppant particulates aid in forming channels through which fluids may flow.

Commonly used proppant particulates in traditional hydraulic fracturing treatments may comprise substantially spherical particles, such as graded sand, bauxite, ceramics, or even nut hulls. Generally, the proppant particulates are placed in the fracture in a concentration such that they form a tight pack of particulates. Unfortunately, in such traditional operations, when fractures close upon the proppant particulates, the particulates can crush or become compacted, potentially forming non-permeable or low permeability masses within the fracture, rather than desirable high permeability masses; such low permeability masses may choke the flow channels of the fluids within the formation. Furthermore, the proppant particulates may become embedded in particularly soft formations, negatively impacting production.

The success of a fracturing operation depends, at least in part, upon fracture porosity, permeability, and conductivity once the fracturing operation is stopped and production is begun. As used herein, the term "porosity" may indicate the volumetric fraction of a formation, fracture, or proppant pack in which voids exist. Fluids or loose solids may, at times, occupy the voids. As used herein, the term "permeability" may indicate the connective porosity of a formation, and it measures the ability of a formation, fracture, or proppant pack to transmit fluids. As used herein, the term "conductivity" may indicate the permeability of a fracture multiplied by the width of the fracture. Traditional fracturing operations place a large volume of proppant particulates into a fracture, and the permeability of the resultant proppant pack is then related to the interconnected interstitial spaces between the abutting proppant particulates. Thus, the resultant fracture permeability from a traditional fracturing operation is closely related to the strength of the placed proppant particulates (if the placed particulates crush, then the pieces of broken proppant may plug the interstitial spaces) and the size and shape of the placed particulate (larger, more spherical proppant particulates generally yield increased interstitial spaces between the particulates). Such traditional fracturing operations tend to result in packed fractures that have a porosity ranging from about 26% to about 46%.

One way to combat the problem of tight proppant particulate packs of traditional fracturing operations involves placing a much reduced volume of proppant particulates in a fracture to create what has been referred to as a "partial monolayer fracture." In such operations, the proppant particulates or aggregates within the fracture tend to be no more than a monolayer thick. The proppant particulates may be widely spaced, thus forming a partial monolayer, but they are still sufficient to hold the fracture open and allow for production. Such operations allow for increased fracture permeability due, at least in part, to the fact the produced fluids may flow around widely spaced proppant particulates rather than just through the relatively small interstitial spaces in a tight proppant pack.

While PMF was investigated to some extent in the 1960's, the concept generally has not been successfully applied for a number of reasons. One problem is that successful placement of a partial monolayer of proppant particulates presents unique challenges in the relative densities of the particulates versus the fracturing or carrier fluid: particulates strong enough to hold a fracture open tend to be formed from relatively denser materials, and so may tend to sink to the bottom, which may make transporting those particulates problematic. Alternatively, particulates that can be carried more easily in a fluid may be unable to support the load from the formation once the fracturing pressure is released. PMF techniques have been developed to address this relative density problem. These techniques include methods of increasing the viscosity of the fracturing or carrier fluid and methods of adding weighting agents to the fracturing or carrier fluid.

However, many techniques which address the relative density problem exacerbate another problem commonly found in PMF operations: residue left by fracturing or carrier fluids. Partial monolayer fractures are usually very narrow. The width of such fractures can generally be determined from the dimensions of a single layer of proppant particulates. The permeability of these narrow fractures can be easily compromised by fluids that leave thick, difficult to remove filter cake. FIG. 1 shows a schematic example of a partial monolayer fracture which is compromised by filter cake buildup. A fracture 15 is located in formation 10. Several proppant particulates 20 have been deposited by a fracturing or carrier fluid (not shown) into the fracture 15. The proppant particulates form a single, non-contiguous layer, thus forming a partial monolayer. The fracturing or carrier fluid has left a residue of filter cake 40 coating substantial portions of both the proppant particulates 20 and the exposed surfaces of the formation 10. The open spaces remaining in the fracture 15 form flow channels 30. The permeability of the fracture relates to the fraction of the total cross-sectional area occupied by flow channels 30.

PMF methods that increase the viscosity of the fracturing or carrier fluid or add weighting agents to the fracturing or carrier fluid tend to aggravate the filter cake problem. For example, conventional water based servicing fluids may comprise polysaccharide-based polymers, which may serve as a food source for bacteria. When deposited in the subterranean formation, such polysaccharide-based polymers may produce a bio-mass that may reduce formation permeability. As another example, polymeric gelling agents commonly are added to treatment fluids to provide a desired viscosity. Examples of commonly used polymeric gelling agents include, but are not limited to, biopolymers, polysaccharides such as guar gums and derivatives thereof, cellulose derivatives, synthetic polymers, and the like. When used to make an aqueous-based viscosified treatment fluid, the gelling agent may be combined with an aqueous fluid, and the soluble portions of the gelling agent dissolve in the aqueous fluid. However, the insoluble portions of the gelling agents, such as proteins, cellulose, and fibers, may remain in the aqueous fluid as residue and may enter the pores of both the subterranean formation and the proppant packs. The presence of this residue, among other things, may impair the producing capabilities and/or the permeability of the subterranean formation.

SUMMARY

The present invention relates to subterranean formation stimulation, and, at least in some embodiments, to novel methods for partial monolayer fracturing ("PMF").

In one embodiment, the novel method of PMF comprises the following steps. Providing at least one fracture in a subterranean formation. Placing a clean fluid into a portion of the at least one fracture, wherein the clean fluid comprises a plurality of proppant particulates. Depositing one or more of the plurality of proppant particulates into the portion of the at least one fracture to form a partial monolayer.

In another embodiment, the novel method of PMF comprises the following steps. Providing a pumping schedule for treating a subterranean formation, wherein the pumping schedule is determined by providing conductivity test data for the subterranean formation; providing a monolayer in situ proppant concentration; identifying at least one point of maximum conductivity in the conductivity test data below the monolayer in situ proppant concentration; identifying a target in situ proppant concentration which correlates with the at least one point of maximum conductivity; and identifying a pumping schedule to provide the target in situ proppant concentration to a desired location in the subterranean formation. Placing a clean fluid into the subterranean formation, wherein the clean fluid comprises a plurality of proppant particulates; and the volume of the clean fluid placed into the subterranean formation and the volumetric concentration of the plurality of proppant particulates in the clean fluid correlates to the pumping schedule.

In another embodiment, a method of the present invention comprises the following steps. Providing at least one fracture in a subterranean formation. Placing a fluid into a portion of the at least one fracture, wherein the fluid comprises a plurality of proppant particulates; and a degradable fluid loss additive, wherein the degradable fluid loss additive comprises collagen. Depositing one or more of the plurality of proppant particulates into the portion of the at least one fracture.

In an embodiment, a method of the present invention comprises placing a fluid into a portion of a subterranean formation, wherein the fluid comprises a degradable fluid loss additive comprising collagen.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects related to some of the embodiments of the present invention, and should not be used to limit or define the invention.

DESCRIPTION OF PREFERRED EMBODIMENTS

Figure 2:
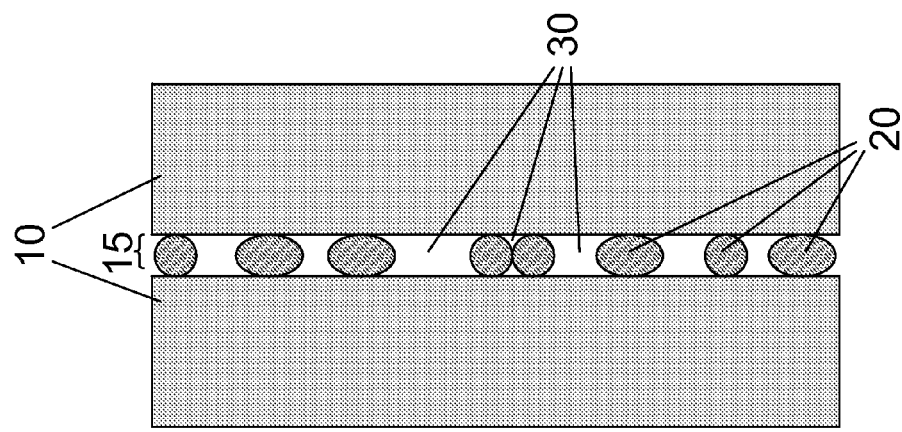
FIG. 2 illustrates one aspect of the invention, wherein a partial monolayer fracture occurs without filter cake buildup.

The present invention relates to subterranean formation stimulation, and, at least in some embodiments, to novel methods for partial monolayer fracturing ("PMF").

As used herein, the term "porosity" may indicate a volumetric fraction of voids in a formation, fracture, or proppant pack. Fluids or loose solids may, at times, occupy the voids.

As used herein, the term "permeability" may indicate the connective porosity of a formation, and it may measure the ability of a formation, fracture, or proppant pack to transmit fluids.

As used herein, the term "conductivity" may indicate the permeability of a fracture multiplied by the width of the fracture.

As used herein, the term "partial monolayer fracture" refers to a fracture in a subterranean formation, wherein spaced proppant particulates or aggregates reside in the open space of the fracture, and wherein the separation between the fracture faces may be less than, or about the same, as the largest exterior dimension of any one of the proppant particulates or aggregates.

As used herein, the term "partial monolayer" may refer to a distribution of proppant particulates or aggregates in a partial monolayer fracture.

As used herein, the term "full monolayer" may refer to a specific type of partial monolayer, wherein the distribution of proppant particulates or aggregates is such that the dimensions of the interstitial spaces of the distribution are smaller than the exterior dimensions of any one of the proppant particulates or aggregates.

As used herein, the term "treatment fluid" refers generally to any fluid that may be used in a subterranean application in conjunction with a desired function and/or for a desired purpose. The term "treatment fluid" does not imply any particular action by the fluid or any component thereof.

As used herein, "clean fluids" are defined to include those fluids that either do not leave a substantial amount of filter cake, or leave only a self-cleaning filter cake. In some embodiments of the invention, a substantial amount of filter cake would include coverage of at least about 25% of the width of the fracture on each face in propped conditions. Moreover, the materials available as "clean fluids" may vary depending on the particular subterranean formation in which the PMF operation occurs.

As used herein, "clean polymers" are those polymers that either do not build filter cake, or build only self-cleaning filter cake. Moreover, as is generally true for clean fluids, the materials available as "clean polymers" may vary depending on the particular subterranean formation in which the PMF operation occurs.

As used herein, the term "clarified xanthan" refers to a xanthan that has a flow rate of at least about 200 ml in 2 minutes at ambient temperature in a filtering laboratory test on a Baroid Filter Press using 40 psi of differential pressure and a 9 cm Whatman filter paper having a 2.7 μm pore size.

As used herein, "nonacetylated" means having fewer acetyl groups than typical xanthan, whether the difference is the result of genetic engineering or bacteria selection or the result of chemical treatment of a typical xanthan. As used herein, "nonpyruylated" means having fewer pyruvyl groups, whether the difference is the result of genetic engineering or bacteria selection or the result of chemical treatment of a xanthan. Furthermore, as used herein, nonpruvylated and nonacetylated are intended to encompass depruvylated and deacetylated, respectively.

The term "clarified diutan" as used herein refers to a diutan that has improved turbidity and/or filtration properties as compared to nonclarified diutan.

The term "gel," as used herein and its derivatives refer to a viscoelastic or semi-solid, jelly-like state assumed by some colloidal dispersions.

As used herein, the term "micro-crosslinked gel" refers to a gel that comprises small, substantially noncontiguous, substantially permanently crosslinked volumes, hereinafter referred to as "micro-domains."

As used herein, "substantially permanently crosslinked gel" may refer to a crosslinked gel which exhibits a crossover frequency of about 0.001 radians per second or less during a small-amplitude oscillatory shear test at 200° F. It is believed that a "substantially permanently crosslinked gel" will remain permanently (i.e., not dynamically) crosslinked through the duration of a subterranean application in which it is being used. A person of ordinary skill in the art with the benefit of this disclosure would be capable of performing an appropriate small-amplitude oscillatory shear test.

As used herein, "volatile hydrocarbon fluids" may refer to hydrocarbon fluids which have high enough vapor pressures under normal conditions to significantly vaporize and enter the atmosphere.

The term "irreversible" as used herein means that a degradable material, once degraded downhole, should not recrystallize or reconsolidate, e.g., the degradable material should degrade in situ but should not recrystallize or reconsolidate in situ.

As used herein, the term "adhesive substance" refers to a material that is capable of being coated onto a particulate and that exhibits a sticky or tacky character such that the proppant particulates that have adhesive thereon have a tendency to create clusters or aggregates.

As used herein, the term "tacky," in all of its forms, generally refers to a substance having a nature such that it is (or may be activated to become) somewhat sticky to the touch.

The term "irreversible degradation" as used herein means that the degradable material, once degraded downhole, should not recrystallize or reconsolidate, e.g., the degradable material should degrade in situ but should not recrystallize or reconsolidate in situ.

As used herein, a polymer is considered to be "degradable" if the degradation is due, inter alia, to a chemical and/or radical process such as hydrolysis, oxidation, or UV radiation.

As used herein, the term "volumetric concentration" may refer to the concentration of proppant in the fluid prior to introduction into the subterranean formation. Volumetric concentration may typically be expressed in pounds of proppant material per gallon of fluid ("lbs/gal"). This may be distinguishable from the in situ concentration of proppant particulates within the fracture, which may typically be expressed in pounds of proppant material per square foot of fracture face ("lbs/ft$^2$").

As used herein, the term "monolayer in situ proppant concentration" may indicate the minimum in situ proppant concentration which is sufficient to produce a full monolayer.

As used herein, the term "fracture gradient" may refer to the pressure required to induce fractures in rock at a given depth. A person of ordinary skill in the art with the benefit of this disclosure would be capable of determining the fracture gradient of a given formation.

If there is any conflict in the usages of a word or term in this specification and one or more patent or other documents that may be incorporated herein by reference, the definitions that are consistent with this specification should be adopted.

The methods of the present invention may be used, inter alia, to create partial monolayer fractures, which may exhibit increased permeability as compared to traditional propped fractures or previously attempted partial monolayer fractures. In some embodiments of the invention, the porosity of the partial monolayer fracture may be between about 50% and about 60%. In some embodiments of the invention, the porosity of the partial monolayer fracture may exceed 60%. Without limiting the invention to a particular theory or mechanism of action, it is nevertheless currently believed that the greater permeability may be due, at least in part, to lower than traditional proppant loading while reducing or eliminating the choking effect of filter cake and/or residue in the fracture.

Generally, the present invention provides methods for propping a fracture in a subterranean formation by forming a partial monolayer of proppant particulates in the fracture. Any means used to fracture a subterranean formation may be utilized to initially create or enhance the fracture, including, but not limited to, hydraulic pressure application, acid fracturing, and hydro jetting. As will be discussed in greater detail below, in some embodiments of the present invention, proppant particulates may be placed at relatively low concentrations within the fracture in the subterranean formation. Preflushes and afterflushes may be used, either alone or in combination, according to common practices during fracturing operations.

As previously discussed, traditional fracturing operations typically place a large volume of proppant particulates into a fracture, and the permeability of the resultant packed propped fracture is then related to the interconnected interstitial spaces between the abutting proppant particulates. The present invention may allow for increased permeability and increased proppant particulate performance, at least in part, because partial monolayer fractures may allow for more and larger flow channels between proppant particulates. With a partial monolayer fracture, there may be more and larger open spaces in the propped fracture than found in traditional, high proppant loading applications, and these spaces may remain open, even under severe closure stresses.

FIG. 2 shows a schematic illustration, according to one embodiment of the invention, of a partial monolayer fracture which may not exhibit a substantial amount of filter cake buildup. A fracture 15 may be located in formation 10. Several proppant particulates 20 may have been deposited by a fracturing or carrier fluid (not shown) into the fracture 15. The proppant particulates may form a single, substantially noncontiguous layer, thus forming a partial monolayer. The open spaces remaining in the fracture 15 may form flow channels 30. The porosity of the fracture may relate to the fraction of the total cross-sectional area occupied by flow channels 30.

Figure 1:
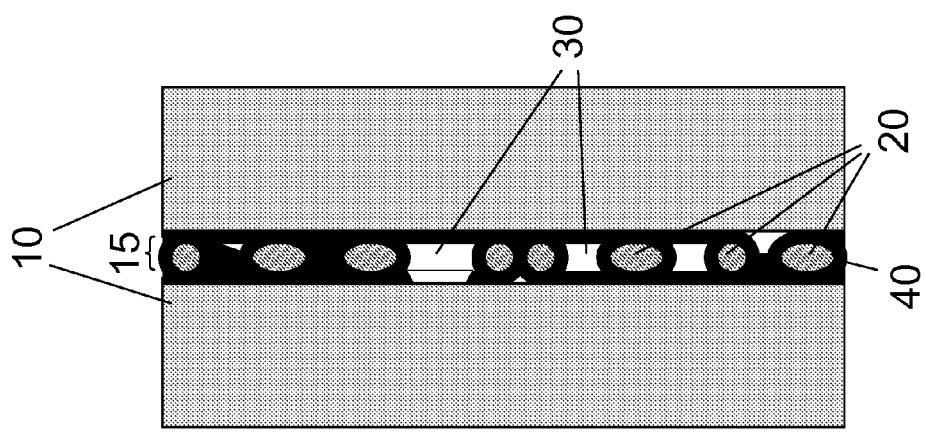
FIG. 1 illustrates an illustration of a propped partial monolayer fracture.

FIG. 2, when viewed in comparison to FIG. 1, shows the potential improvement in permeability of fracture 15 when filter cake 40 residue has been reduced, eliminated, or removed, according to one aspect of this invention. The potential improvement in permeability may derive from either an increase in size or an increase in number of flow channels 30. Although this schematic depicts a single, vertical fracture 15, it should be understood that the methods of the present invention may be applicable to a wide variety of fractures, including single, multiple, and branched fractures.

Any of such fractures may include portions which have generally vertical components, generally horizontal components, or a combination of vertical and horizontal components. It should be understood that the fracture(s) in the methods of the present invention (e.g., fracture 15) may have existed prior to the introduction of the fracturing or carrier fluid (not shown), or the fracture(s) in the methods of the present invention may have been created and/or extended by the action of introducing the fracturing or carrier fluid.

Without limiting the invention to a particular theory or mechanism of action, it is nevertheless currently believed that the methods of the present invention may act not only to increase the available space for production flow, but also to eliminate non-Darcy effects during production. Generally, non-Darcy effects are caused by inertial forces due to expansion and contraction of the local flow inside flow channels found in typical proppant packs. The partial monolayer propped fractures, decrease or eliminate the cycles of expansion and contraction because the interstitial spaces found in traditional propped fractures are not present.

Any clean fluid suitable for traditional hydraulic fracturing treatments may be used as fracturing or carrier fluids in a PMF operation in accordance with the teachings of the present invention. It should be appreciated by one of ordinary skill in the art that the materials available as "clean fluids" may vary depending on the particular subterranean formation in which the PMF operation occurs. For example, some polymers may leave filter cake in certain subterranean formations, but not in other subterranean formations. Such polymers would qualify as clean fluids only in those instances where the PMF operation occurs in a subterranean formation in which the polymer would either not leave filter cake, or leave only a self-cleaning filter cake.

It should be appreciated by one of ordinary skill in the art that, in some instances, testing for a clean fluid generally involves a relatively simple pressure test of a fluid as it flows through a core sample for a particular subterranean formation (see infra Examples). Fluids which may qualify as clean fluids for that formation may be those that do not exhibit a substantial, sustained increase in pressure over time as non-self-cleaning filter cake builds in the core sample. Additionally, clean fluids may include fluids which do not leave a residue following reduction of viscosity with a breaker.

Suitable clean fluids may include gases, such as carbon dioxide, nitrogen, air, propane, natural gas, and mixtures thereof.

It should be appreciated by one of ordinary skill in the art that, in certain embodiments, clean fluids may not include a significant amount of guar, non-clarified biopolymers, guar derivatives, non-clarified polymers, and other natural or man-made polymers that leave residue.

In some embodiments of the invention, clean fluids may include clean polymers. It should be appreciated by one of ordinary skill in the art that, as is generally true for clean fluids, the materials available as clean polymers may vary depending on the particular subterranean formation in which the PMF operation occurs. A variety of clean polymers may be used, including clarified biopolymers, such as clarified xanthan, clarified diutan, clarified hydroxyethylcellulose ("HEC"), succinoglycan, clarified scleroglucan, mixtures thereof, and the like. These fluids can be made into foams for improved fluid properties. Foams can be created by the addition of a gas, such as carbon dioxide or nitrogen. These clean polymers may be made into emulsion base fluids. One example of a clean polymer emulsion may be an emulsion composed of an internal hydrocarbon phase (such as diesel, kerosene, condensate, or crude oil) and an external gelled water phase containing a clean polymer gelling agent. In this example, the internal hydrocarbon phase may be between about 50% and about 80% of the total volume, and the remaining volume may be composed of the gelled water, emulsifier, and other additives. In some examples, the clean polymer emulsion fluid may be stabilized with an emulsifier. The clean polymers also may be crosslinked. Any polymer which breaks leaving no filter cake or that gives high regained permeability would also be suitable. In some embodiments of the invention, this may include synthetic polymers, such as polyacrylamides.

In some embodiments, suitable clarified xanthans may have been treated with methods involving enzymes or any other suitable method, inter alia, to remove any debris from the xanthan polymer.

In some embodiments, clarified xanthan may be especially suitable. In some embodiments, suitable clarified xanthans are capable of hydrating in a brine to produce an increase in viscosity. In some embodiments, suitable clarified xanthans may have been treated with methods involving enzymes or any other suitable method, inter alia, to remove any debris from the xanthan polymer, for example, residual cellular structures, such as cell walls, from a standard xanthan. In some embodiments, suitable clarified xanthans may be produced from genetically modified or bioengineered strains of bacteria or other strains of bacteria that allow the clarified xanthan to have improved functional properties such as filterability, turbidity, etc. In one embodiment, suitable clarified xanthans may be modified by genetic engineering or bacteria selection or the result of chemical treatment or derivatization of a xanthan. An example of such a modification would be where a portion of the xanthan is oxidized or hydrolyzed. In one embodiment, the clarified xanthan may be modified, such as nonacetylated and/or nonpyruvylated xanthan. Another example of modified xanthan is partially oxidized xanthan. In some embodiments, suitable clarified xanthan also may be present in a form that will only partially hydrate or will not hydrate at ambient temperature. This form of clarified xanthan may be chemically modified, chemically coated, genetically modified, or produced from a new strain of bacteria.

In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc. In one embodiment, the clarified diutan may be modified by genetic engineering or bacteria selection or the result of chemical treatment or derivatization of a diutan. An example of such a modification would be where a portion of the diutan is oxidized or hydrolyzed. Suitable clarified diutan also may be present in a form that will only partially hydrate or will not hydrate at ambient temperature. This form of clarified diutan may be chemically modified, chemically coated, genetically modified, or produced from a new strain of bacteria. Additional information regarding clarified diutan may be found in U.S. patent application Ser. Nos. 11/704,121, 11/704,598, and 11/704,009, each entitled "Treatment Fluids Comprising Diutan and Associated Methods," the entire disclosure of which is incorporated herein by reference.

In some embodiments, a gelling agent of the present invention comprising a suitable clarified diutan at a 0.1% concentration in deionized water, in a 1 cm optical cell, has a transmittance at 600 nanometers ("nm") wavelength of at least about 65%. In some embodiments, the clarified diutan has a transmittance of at least about 75%. In some embodiments, the clarified diutan has a transmittance of at least about 85%. One of ordinary skill in the art with the benefit of this disclosure will recognize that the transmittance of any particular gelling agent of the present invention also may vary depending on the addition of certain additives, the composition of the gelling agent, the degree of hydration of the clarified diutan, the temperature, and the pH of the gelling agent. For example, ordinary, unclarified diutan such as GEOVIS XT has a transmittance of about 58% or less.

In some embodiments, a gelling agent of the present invention comprising a suitable clarified diutan at a 0.1% concentration in deionized water, in a 1 cm optical cell, has a transmittance at 350 nanometers ("nm") wavelength of at least about 20%. In some embodiments, the clarified diutan has a transmittance of at least about 25%. In some embodiments, the clarified diutan has a transmittance of at least about 30%. In some embodiments, the clarified diutan has a transmittance of at least about 40%. In some embodiments, the clarified diutan has a transmittance of at least about 50%. In some embodiments, the clarified diutan has a transmittance of at least about 60%. In some embodiments, the clarified diutan has a transmittance of at least about 70%. In some embodiments, the clarified diutan has a transmittance of at least about 80%. In some embodiments, the clarified diutan has a transmittance of at least about 90%. One of ordinary skill in the art with the benefit of this disclosure will recognize that the transmittance of any particular gelling agent of the present invention also may vary depending on the addition of certain additives, the composition of the gelling agent, the degree of hydration of the clarified diutan, the temperature, and the pH of the treatment fluid. For example, ordinary, unclarified diutan such as GEOVIS XT has a transmittance of about 18% or less.

In some embodiments of the invention, suitable clean fluids may include a surfactant gel (e.g., viscoelastic surfactant gel ("VES")). Since these gels are believed to not form a filter cake, they may be used as clean fluids according to one embodiment of this invention. Suitable clean fluids also may include polymer-free foams.

In some embodiments of the invention, suitable clean fluids may include a micro-crosslinked gel. Additional information regarding micro-crosslinked gels may be found in U.S. Published Patent Application No. 2009/0255677, entitled "Micro-Crosslinked Gels and Associated Methods," filed on the same day herewith, and the entire disclosure of which is incorporated herein by reference.

In certain embodiments of the invention, clean fluids that leave a filter cake that is self-cleaning may be used. Examples of such fluids are those that include a viscosifier or gelling agent with an optional fully degradable fluid loss agent, such as a mixture of crystalline and amorphous polylactic acid ("PLA"). Examples of such viscosifiers or gelling agents include, but are not limited to, HEC, diutan, and "WG-37," which is commercially available from Halliburton Energy Services, Inc. of Duncan, Okla. Suitable sources of diutan are "FDP-S848-07" and "FDP-S849-07," each of which are commercially available from Halliburton Energy Services, Duncan, Okla. The viscosifier or gelling agent may or may not be crosslinked. The viscosifier or gelling agent also may contain a breaker. Magnesium peroxide also may be included to generate a relatively high concentration of hydrogen peroxide at the fracture face once the PLA releases acid.

Other embodiments of the invention utilize clean fluids that may evaporate quickly, such as volatile hydrocarbon fluids. As discussed in U.S. Pat. Nos. 6,511,944, 6,544,934, 7,168,490, 7,293,611, 7314850, and 7,328,744, each issued to Taylor, et al. (the entire disclosures of which are herein incorporated by reference), liquid hydrocarbon blends that comprise at least about 65% hydrocarbons having from six carbons ($C_6$) through eleven carbons ($C_{11}$) may exhibit increased volatility versus conventional servicing fluids, thereby leaving minimal residue in the formation.

In certain embodiments of the invention, suitable clean fluids may include an ester and/or orthoester. Although these fluids initially may leave filter cake, formation water or a small amount of water included in the treatment would eventually break down the system to acid and alcohol. The acid would dissolve any filter cake buildup, thereby evincing this as self-cleaning filter cake. Fluid loss additives such as polyesters and polyorthoesters optionally may be included.

Any of the above clean fluids optionally may be foamed, energized, or emulsified. Foams can be created by the addition of a gas, such as carbon dioxide, nitrogen, or mixtures thereof. The foam or emulsion may be stabilized with a surfactant.

Emulsions—both water internal and water external—may be suitable clean fluids in some embodiments of the invention. Suitable clean fluids may include an emulsion made with volatile hydrocarbons. Suitable clean fluids may include an emulsion that uses esters or orthoesters as the internal phase. The esters or orthoesters may be chosen such that they are insoluble in the water phase so that a stable emulsion is used. Suitable clean fluids may include an emulsion made with a degradable emulsifier. Degradable emulsifiers may degrade after exposure to temperature over time, or after contact with the formation. Suitable degradable emulsifiers may include "AF-61™ Emulsifier," which is commercially available from Halliburton Energy Services, Inc. of Duncan, Okla.

The suitable clean fluid may require the use of a degradable fluid loss additive to control loss of fluid from the fracture. The fluid loss material may consist of PLA, oil-soluble resins, soaps, benzoic acid, collagen, etc. The structure of foams and emulsions also may aid in fluid loss control. Magnesium peroxide may be added to the fracturing or carrier fluid to act as both a fluid loss control additive and as a breaker.

In certain embodiments, collagen may be an especially good choice as a degradable fluid loss additive because it will ultimately degrade in water. For the same reason, collagen may be a good candidate for a diverting material. Fluid loss and diverting applications of collagen may include drilling fluids, gravel packing, fracturing, matrix treatments, and well bore operations. Drilling fluids applications of collagen may include drill-in fluids. Fracturing uses of collagen may include hydraulic fracturing with proppant, frac packs, and acid fracturing. Matrix treatments with collagen may include water shut-off treatments, acid treatments, stimulation with chelates, scale removal, scale squeezes, asphaltene removal, asphaltene inhibitor squeezes, paraffin removal, paraffin inhibitor squeezes, resin treatments, surface modifying agent treatments, tackifier treatments, and the like. Other uses of collagen may include use as a fluid loss pill either by itself or in conjunction with a gelled fluid.

The subterranean treatment fluids of the present invention may comprise one or more of any additional additives known in the art. Examples of such additional additives include, but are not limited to, hydrate inhibitors, clay stabilizers, sulfide scavengers, fibers, nanoparticles, consolidating agents (such as resins and/or tackifiers), salts, salt substitutes (such as tetramethyl ammonium chloride) soaps, surfactants, co-surfactants, cross-linkers, carboxylic acids, acids, fluid loss control additives, buffers, gas, foamers, defoamers, emulsifiers, demulsifiers, iron control agents, solvents, mutual solvents, particulate diverters, gas phase, carbon dioxide, nitrogen, other biopolymers, synthetic polymers, corrosion inhibitors, corrosion inhibitor intensifiers, pH control additives, scale inhibitors, asphaltene inhibitors, paraffin inhibitors, catalysts, stabilizers, chelants, clay control agents, biocides, bactericides, friction reducers, antifoam agents, bridging agents, dispersants, flocculants, $H_2S$ scavengers, $CO_2$ scavengers, oxygen scavengers, lubricants, viscosifiers, breakers, breaker activators, weighting agents, relative permeability modifiers (such as HPT-1™ chemical additive available from Halliburton Energy Services, Duncan, Okla.), surface modifying agents, resins, particulate materials (e.g., proppant particulates), wetting agents, coating enhancement agents, combinations thereof, and the like. A person skilled in the art, with the benefit of this disclosure, will recognize the types of additives that may be included in the treatment fluids for a particular application. To maintain the suitability of the fluid, any additive is preferably degradable, soluble, or easily transportable out of the formation.

The suitable clean fluid may include an aqueous or non aqueous base. In those embodiments where the base is aqueous, the water used to form the base may be fresh water, salt water, brine, formation brine, sea water, or any other aqueous liquid that does not adversely react with the other components. The density of the water may be increased to provide additional particle transport and suspension in the present invention.

Proppant particulates suitable for use in the methods of the present invention may be of any size and shape combination known in the art as suitable for use in a fracturing operation. One of ordinary skill in the art with the benefit of this disclosure will be able to recognize an appropriate proppant material for a particular application based on, for example, depth of the formation and fracture stress. Proppant particulates may be either rigid or deformable. Without limiting the invention to a particular theory or mechanism of action, it is nevertheless currently believed that deformable particulates may provide better mechanical characteristics for PMF operations due to the fact that less point-loading may occur. Generally, where the chosen proppant particulate is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series.

In some embodiments of the present invention, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular shaped, rod shaped, ellipse shaped, cone shaped, pyramid shaped, or cylinder shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid, as is often done to transport proppant particulates to desired locations within subterranean formations. By so resisting settling, substantially non-spherical proppant particulates may provide improved proppant particulate distribution as compared to more spherical proppant particulates.

In poorly consolidated formations (that is, formations that, when assessed, fail to produce a core sample that can be satisfactorily drilled, cut, etc.) the use of substantially non-spherical proppant particulates also may help to alleviate the embedment of proppant particulates into the formation surfaces (such as a fracture face). As is known by one skilled in the art, when substantially spherical proppant particulates are placed against a formation surface under stress, such as when they are used to prop a fracture, they are subject to point loading. By contrast, substantially non-spherical proppant particulates may be able to provide a greater surface area against the formation surface and thus may be better able to distribute the load of the closing fracture.

Proppant particulates used in the present invention may comprise any material suitable for use in subterranean operations. Conventional materials utilized as proppant and/or gravel particulates in include, but are not limited to: sand; bauxite; ceramic materials; glass materials; polymer materials; Teflon® materials; nut shell pieces; seed shell pieces; fruit pit pieces; wood; composite particulates; light weight proppant; cured resinous particulates comprising nut shell pieces, seed shell pieces, inorganic fillers, and/or fruit pit pieces; and combinations thereof. Additionally, composite particulates may be utilized as proppant and/or gravel particulates. Such composites may include a binder and a filler material, wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Sand is also a common particulate utilized with subterranean treatment fluids. In some embodiments of the present invention, the proppant particulates may be composed of at least one high density plastic. As used herein, the term "high density plastic" refers to a plastic having a specific gravity of greater than about 1. The preferable density range is from about 1 to about 2. More preferably, the range is from about 1 to about 1.3. The most preferable is from about 1.1 to 1.2. In addition to being a high density plastic, plastics suitable for use in the present invention generally exhibit a crystallinity of greater than about 10%. In some embodiments, the high density plastic used to form the proppant particulates of the present invention exhibits a crystallinity of greater than about 20%. While the material is referred to as "high density," it will be readily understood by one skilled in the art that the density is "high" relative to other plastics, but may be low as compared to traditional proppant particulate densities. For example, Ottawa sand may exhibit a specific gravity of about 2.65, whereas man-made ceramic proppant materials generally have specific gravities ranging from about 2.7 to about 3.6. The relatively low density of the high density plastics used to create the proppant particulates of the present invention may be beneficial to an even distribution when the proppant particulates are slurried into a fluid such as a fracturing or carrier fluid. Such even distribution may be particularly helpful in forming a partial monolayer proppant pack that is capable of holding open the majority of a fracture. Uneven distribution could result in a situation wherein a portion of a fracture is propped while another portion is substantially void of proppant particulates and thus, does not remain open once the hydraulic pressure is released.

Some well-suited high density plastic materials include polyamide 6 (Nylon 6), polyamide 66 (Nylon 6/6), acrylic, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, PETG copolyester, polyetherimide, polyphenylene ether, molded polyphenylene sulfide (PPS), heat resistant grade polystyrene, polyvinylbenzene, polyphenylene oxide, a blend of polyphenylene oxide and nylon 6/6, acrylonitrile-butadiene-styrene, polyvinylchloride, fluoroplastics, polysulfide, polypropylene, styrene acrylonitrile, polystyrene, phenylene oxide, polyolefins, polystyrene divinylbenzene, polyfluorocarbons, polyethers etherketones, polyamide imides, and combinations thereof. Some other well-suited high density plastic materials include oil-resistant thermoset resins such as acrylic-based resins, epoxy-based resins, furan-based resins, phenolic-based resins, phenol/phenol formaldehyde/furfuryl alcohol resins, polyester resins, and combinations thereof.

One benefit of using proppant particulates formed from high density plastic is that they may be created on-the-fly during a fracturing or frac-packing operation. U.S. Pat. Ap. Pub. No. 2005/0267001, filed May 26, 2004, the entire disclosure of which is hereby incorporated by reference, describes methods of creating proppant particulates from thermoplastic materials on-the-fly. As described in that application, one example of a method for preparing proppant on-the-fly generally comprises providing a mixture comprising a thermoplastic/thermosetting polymer and a filler; heating the resin mixture; extruding, atomizing, or spraying the mixture to particulate form into a well bore containing a treatment fluid; and allowing the extruded particulate to substantially cure and form proppant particulates. This method relies, at least in part, on the ability of thermoplastic/thermosetting materials to be extruded from a liquid form at an elevated temperature and then, as the material cools, to then harden and form into a solid material. The thermoplastic or thermosetting proppant particulates can be prepared on-the-fly, according to the present invention, to a suitable size and shape.

Density and strength of proppant particulates formed from thermoplastic/thermosetting materials may be customized to meet the fracturing designs and well conditions. To help eliminate the problems that may be caused by large particle size, in one embodiment the on-the-fly thermoplastic proppant particulates may be introduced into the fracturing or carrier fluid at the discharge side of the pump. As will be recognized by one skilled in the art, during pumping of such on-the-fly proppant particulates (particularly where the flow passes through one or more perforations), the proppant particulates may break into smaller sizes as a result of high shear as they are being placed inside a portion of a subterranean formation.

In some embodiments of the present invention, it may be desirable to reinforce the proppant particulates to increase their resistance to a crushing or deforming force. Suitable reinforcing materials include high strength particles such as bauxite, nut hulls, ceramic, metal, glass, sand, asbestos, mica, silica, alumina, and any other available material that is smaller in size than the desired, final high density plastic proppant particulate and that is capable of adding structural strength to the desired, final high density plastic proppant particulate. In some embodiments of the present invention, the reinforcing material may be a fibrous material such as glass fibers or cotton fibers. Preferably, the reinforcing material is chosen so as to not unduly increase the specific gravity of the final proppant particulate.

In some embodiments, the proppant particulates are coated with an adhesive substance, so that they will have the tendency to adhere to one another when they come into contact. The adhesive should be strong enough that the proppant particulates remain clustered together while under static condition or under low shear rates. As the shear rate increases, the proppant clusters or aggregates may become dispersed into smaller clusters or even individual proppant particulates. This phenomenon may repeat again and again from the time the coated proppant is introduced into the fracturing or carrier fluid, pumped into the well bore and fracture, and even after being placed inside the fracture.

Adhesive substances suitable for use in the present invention include non-aqueous tackifying agents; aqueous tackifying agents; silyl-modified polyamides; and curable resin compositions that are capable of curing to form hardened substances. In addition to encouraging the proppant particulates to form aggregates, the use of an adhesive substance may yield a propped fracture that experiences very little or no undesirable proppant flow back. Adhesive substances may be applied on-the-fly, applying the adhesive substance to the proppant particulate at the well site, directly prior to pumping the fluid-proppant mixture into the well bore.

In some embodiments of the present invention, a portion of the proppant particulates may be formed from degradable material. One purpose of including degradable particles in a propped fracture (be it a partial monolayer fracture or a traditional propped fracture) may be to ensure the porosity of the propped fracture. Despite the preference for forming a partial monolayer, proppant particulates may nonetheless form a full monolayer or a packed portion in the fracture due, inter alia, to uneven distribution, particulate accumulation, or particulate settling. However, as the degradable particles are removed with time, the porosity of the propped fracture may increase. The degradable particles may be substantially uniformly distributed amongst the proppant particulates in the propped fracture. Over time, the degradable material may degrade in situ, causing the degradable particles to be substantially removed from the propped fracture, and leaving voids between the proppant particulates. These voids may enhance the porosity of the propped fracture, which may result, inter alia, in enhanced permeability. Degradable materials that may be used in conjunction with the present invention include, but are not limited to, degradable polymers, dehydrated compounds, and mixtures thereof. Such degradable materials are capable of undergoing an irreversible degradation downhole.

In some embodiments of the present invention, from about 10% to about 90% of the total proppant particulates used to form the partial monolayer fracture comprise degradable material. In other embodiments, from about 20% to about 70% of the total proppant particulates used to form the partial monolayer fracture comprise degradable material. In still other embodiments, from about 25% to about 50% of the total proppant particulates used to form the partial monolayer fracture comprise degradable material. One of ordinary skill in the art with the benefit of this disclosure will recognize an optimum concentration of degradable material that provides desirable values in terms of enhanced permeability without undermining the stability of the partial monolayer fracture itself.

The specific physical features of the degradable material may be chosen or modified to provide the partial monolayer fracture with optimum permeability. The degradable material may be selected to have a similar particle size, shape, and specific gravity as those of the rest of the proppant particulates to enhance the substantially uniform distribution of degradable particulate among the particulates and to minimize the segregation between the particulate materials. The degradable materials may be selected to have a particle shape which may provide desired characteristics in the resultant voids, including, but not limited to, particles having the physical shape of platelets, shavings, flakes, ribbons, rods, strips, spheroids, toroids, pellets, tablets, or any other physical shape. One of ordinary skill in the art with the benefit of this disclosure will recognize the preferred particle size, shape, and specific gravity for a given application.

A tackifying compound optionally may be coated onto any portion or all of the proppant material, among other purposes, to promote uniform distribution of degradable particles as the proppant particulates are blended, pumped down hole, and placed inside the created fracture.

In some embodiments, the degradable particles may be made from oil-degradable materials. Where such oil-degradable proppant particulates are used, in the event the closure of the fracture undesirably compacts the proppant (thus undesirably reducing the permeability of the proppant pack), the oil-degradable proppant may be degraded by the produced fluids, thus restoring at least some of the lost permeability. The degradable proppant also may be degraded by materials purposely placed in the formation, mixing the degradable particles with delayed reaction degradation agents, or other suitable means to induce degradation.

Suitable degradable materials may include oil-degradable polymers. Oil-degradable polymers that may be used in accordance with the present invention may be either natural or synthetic polymers. Some particular examples include, but are not limited to, polyacrylics, polyamides, and polyolefins such as polyethylene, polypropylene, polyisobutylene, and polystyrene. Other suitable oil-degradable polymers include those that have a melting point which is such that the polymer will dissolve at the temperature of the subterranean formation in which it is placed, such as a wax material.

In addition to oil-degradable polymers, other degradable materials that may be used in conjunction with the present invention include, but are not limited to, degradable polymers, dehydrated salts, and/or mixtures of the two. The degradability of a polymer depends at least in part on its backbone structure. For instance, the presence of hydrolyzable and/or oxidizable linkages in the backbone often yields a material that will degrade as described herein. The rates at which such polymers degrade may be dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic or aromatic polycarbonates; poly(orthoesters); poly(amino acids); poly(ethylene oxides); and polyphosphazenes. Of these suitable polymers, aliphatic polyesters and polyanhydrides are preferred.

Dehydrated salts may be used in accordance with the present invention as a degradable material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include but are not limited to anhydrous sodium tetraborate (also known as anhydrous borax), and anydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Other examples of dehydrated salts suitable for use in the present invention may include calcium carbonate plus acid. Still other examples, such as calcium citrate, may include combinations of insoluble salts with acid generating materials, wherein the salt chosen may increase in solubility as the pH lowers.

Blends of certain degradable materials also may be suitable. One example of a suitable blend of materials is a mixture of poly(lactic acid) and sodium borate where the mixing of an acid and base may result in a neutral solution where this is desirable. Another example would include a blend of poly(lactic acid) and boric oxide. Other materials that undergo an irreversible degradation also may be suitable, if the products of the degradation do not undesirably interfere with either the permeability of the proppant matrix or with the production of any of the fluids from the subterranean formation.

In choosing the appropriate degradable material, one may want to consider the degradation products that will result. These degradation products should not adversely affect other operations or components and may even be selected to improve the long term performance/permeability of the propped fracture. The choice of degradable material also can depend, at least in part, on the conditions of the well, e.g., well bore temperature.

In some embodiments, a preferable result may be achieved if the degradable material degrades over a period of time (as opposed to instantaneously). Even more preferable results have been obtained when the degradable material does not begin to degrade until after the proppant matrix is in place in the fracture or, as may be the case with coated proppant, until it has developed some compressive strength. The slow degradation of the degradable material helps, inter alia, to maintain the stability of the proppant matrix.

As previously stated, in some embodiments of the present invention, proppant particulates may be placed at relatively low in situ concentrations within the fracture in the subterranean formation. In order to obtain the partial monolayer placement of the proppant particulates, the proppant may be introduced into the fracturing or carrier fluid at a relatively low volumetric concentration. In some embodiments of this invention, the proppant may be introduced into the fracturing or carrier fluid in volumetric concentrations between about 0.005 lb/gal and 1.0 lb/gal. One of ordinary skill in the art with the benefit of this disclosure should be able to determine the appropriate volumetric concentration for a particular application based on, for example, the density of the proppant, the density of the fracturing or carrier fluid, and the width of the fracture.

The optimum fraction of surface area of the fracture face which may be covered by proppant may vary with the parameters of a particular application of the present invention. One of ordinary skill in the art with the benefit of this disclosure should be able to determine the desired coverage fraction for a particular application based on, for example, closure stress at the fracture, depth within the formation, and material properties of the proppant. In one embodiment, the proppant forming the partial monolayer may cover about 40% to about 60% of the surface area of the fracture face. In another embodiment of the invention, the proppant forming the partial monolayer may cover about 60% to about 70% of the surface area of the fracture face. In some embodiments, the proppant may cover up to 90% of the surface area of the fracture face.

Although there are similarities with the design process for traditional hydraulic fracturing, a method of designing a PMF treatment according to one embodiment of the invention may include additional steps, and some steps may be unexpectedly more sensitive to in situ proppant concentration. According to one embodiment of the invention, design of a PMF treatment may not allow for the common practice of over-design in in situ concentration to account for uncertainties. Without limiting the invention to a particular theory or mechanism of action, it is nevertheless currently believed that conductivity test data may show that, as in situ concentration increases, conductivity may initially increase, reach a maximum, and then decreases to a minimum when the in situ concentration reaches the "monolayer in situ proppant concentration." (As would be understood by a person of ordinary skill in the art, common reference texts such as RECENT ADVANCES IN HYDRAULIC FRACTURING, SPE Monograph Series, Vol. 12 (1989), may be used to determine the monolayer in situ proppant concentration.) Above the monolayer in situ proppant concentration, conductivity may continuously increase with increasing in situ concentration. When designing a treating method of the present invention, the point of maximum conductivity that lies below the monolayer in situ proppant concentration may be selected as the design target. Since conductivity may decrease from this point of maximum conductivity for both a decrease and an increase in in situ concentration, the common practice in traditional hydraulic fracturing of increasing the in situ concentration to account for uncertainties may not be appropriate. It should be understood that for some types of formations and some types of proppant, there will be no point of maximum conductivity that lies below the monolayer in situ proppant concentration, which would indicate a less suitable combination for the methods of this invention.

Any method or instrumentation known in the art may be used to determine a pumping schedule in certain embodiments of the present invention. As used herein, the term "pumping schedule" may refer to time-dependent fluid volumes and volumetric proppant concentrations to be placed in a subterranean formation when treating the formation. In one embodiment of the invention, a fracture simulator (such as "FracproPT™," commercially available from Pinnacle Technologies, Inc., of Houston, Tex.; "GOHFER®," commercially available from Barree & Associates in association with Stim-Lab, a division of Core Laboratories; or "StimPlan," commercially available from NSI Technologies of Tulsa, Okla.) may be used to help determine an appropriate pumping schedule to be used when performing a particular method of the present invention. As would be understood by a person of ordinary skill in the art, the pumping schedule may be adjusted in the simulator to achieve a desired target in situ proppant concentration. Design of traditional hydraulic fracturing treating methods may not be strongly constrained by the proppant distribution in the fracture, typically requiring only at least a minimum in situ concentration. Since much less proppant may be used in PMF, achieving the desired target in situ proppant concentration may become the primary design objective. In some embodiments of the invention, the pumping schedule may be provided by the same person or entity that places proppant particulates within a fracture in a subterranean formation. In other embodiments of the invention, the pumping schedule may be provided by a different person or entity than that who places proppant particulates within a fracture in a subterranean formation.

To facilitate a better understanding of the present invention, the following examples of certain aspects of some embodiments are given. In no way should the following examples be read to limit, or define, the entire scope of the invention.

EXAMPLES

An Aloxite plug, approximately 2.5 cm in diameter by approximately 4.0-5.0 cm in length, is used for this test. This manufactured material is used to reduce the variability normally seen in either quarried or formation rock samples. The porosity of the Aloxite plug is estimated to be about 22%, with the value used in calculating the number of pore volumes flowed for each fluid. The plug is mounted in a Hassler sleeve to promote linear fluid flow through the plug. An overburden pressure of about 1,300 psi is maintained on the Hassler sleeve throughout the test. A backpressure regulator set at about 200 psi is placed on the discharge side of the plug. This maintains an actual overburden pressure of approximately 1,100 psi on the plug throughout the test. The temperature of the Aloxite plug is maintained at the test temperature throughout the test by use of a heating jacket.

Figure 3:
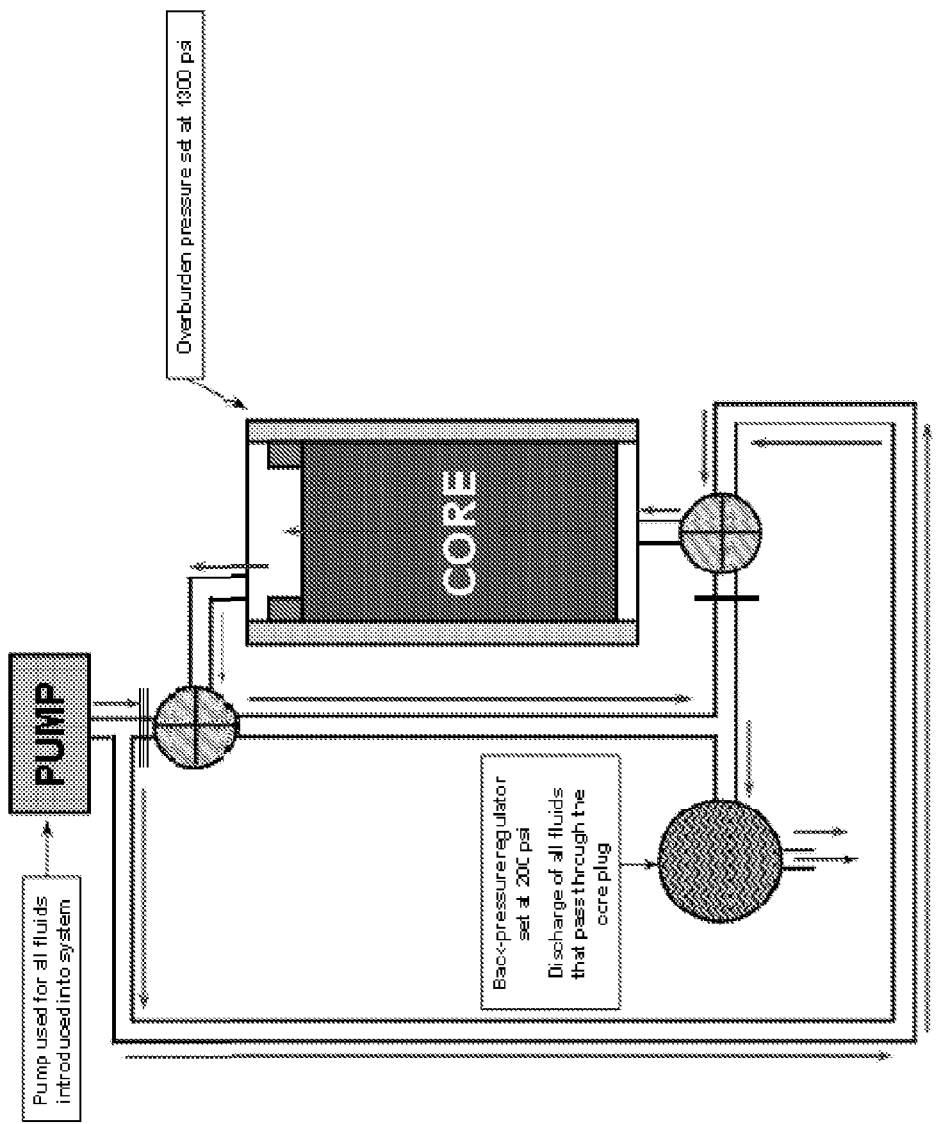
FIG. 3 illustrates a test apparatus used in a regained permeability test showing flow in a production direction.

In the two production stages of the test, brine enters the test cell and exits the end of the core that simulates the well bore. The fluid flows through the core plug and exits through the back-pressure regulator set at 200 psi. One example of this arrangement is illustrated in FIG. 3.

Figure 4:
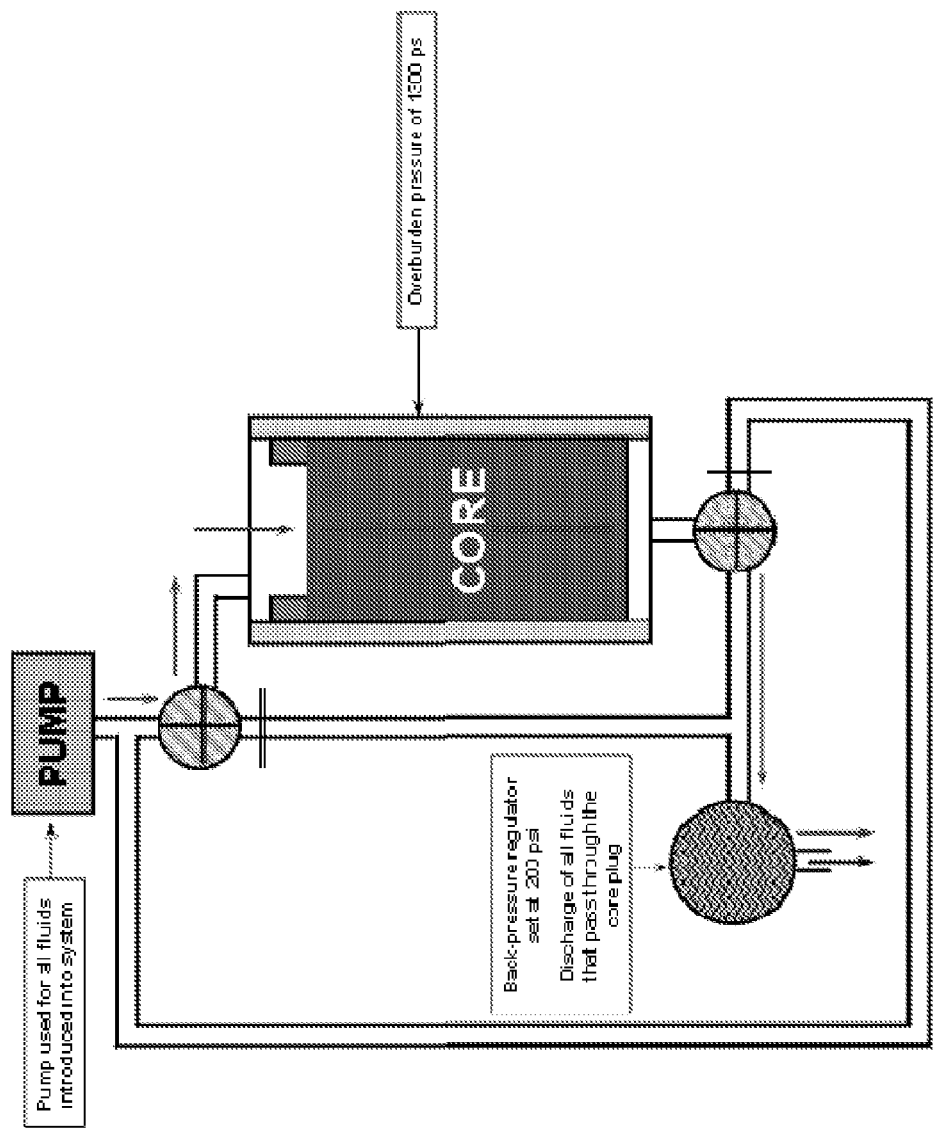
FIG. 4 illustrates a test apparatus used in a regained permeability test showing flow in an injection direction.

In the treatment fluid stage of the test—which may occur between the two production stages of the test—the treatment fluid being pumped enters the test cell and contacts the end of the core that simulates the well bore. The fluid flows through the core plug and exits through the back-pressure regulator set at 200 psi. One example of this arrangement is illustrated in FIG. 4.

The initial stage of fluid consists of API Standard Brine (see Table 1 below) flowed at 5 mL/min. This fluid is used to obtain an initial permeability to an aqueous fluid, with that aqueous fluid being non-damaging to the plug. Flow of this fluid is continued until a relatively constant pressure reading is obtained across the plug. The treatment fluid is then flowed through the plug in the opposite direction until (1) about 10 pore volumes of the fluid flow into the plug, (2) the fluid is pumped for a total of one hour, or (3) until the differential pressure across the plug reaches about 1,000 psi. Flow through the plug is stopped and the plug is "shut in" for a period determined by break time of the gravel pack fluid, which may generally be about 96-144 hours. After the shut in period, a second synthetic formation brine stage is flowed in the production direction at about 5 mL/min until a constant pressure drop is seen across the plug.

TABLE 1

| API Standard Brine Formulation | |
| --- | --- |
| Component | Amount |
| Fresh Water | 900 mL |
| Sodium Chloride (NaCl) | 90.00 grams |
| Calcium Chloride (CaCl$_2$•2H$_2$O) | 11.12 grams |

A moderate-to-large increase in the pressure drop across the plug (decrease in permeability of greater than about 30%) compared to the first synthetic formation brine stage may show that the gelled fluid had damaged the plug and may be considered unacceptable. A small increase in the pressure drop across the plug or lack of pressure change (decrease in permeability of no more than about 30%) may be considered acceptable.

TABLE 2

| Test Parameters | | |
| --- | --- | --- |
| | Test 1 (FIG. 5) | Test 2 (FIG. 6) |
| Test Treatment Fluid | crosslinked xanthan | diutan |
| Test Temperature | 245° F. | 215° F. |
| Fluid Preheat Temperature | 215° F. | |
| Flow Rate | 2 mL/min | 5 mL/min |
| Core Material | 30 micron Aloxite | 30 micron Aloxite |
| Core Length | 4.875 cm | 7.396 cm |
| Core Diameter | 2.521 cm | 2.496 cm |
| Approximate Regained Permeability | 101% | 90% |

Figure 5:
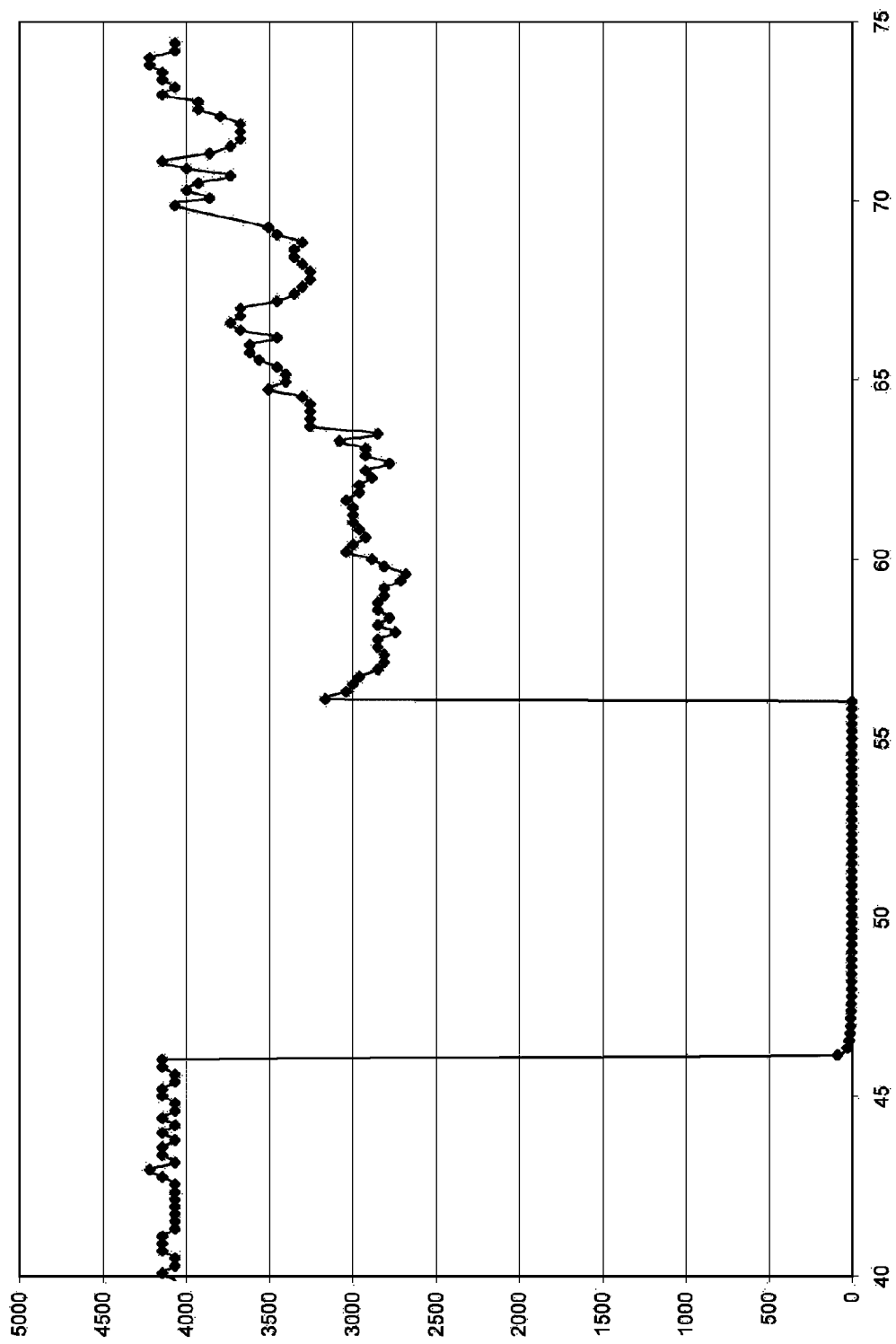
FIG. 5 presents test results for a regained-permeability test with a fluid comprising crosslinked xanthan.
Figure 6:
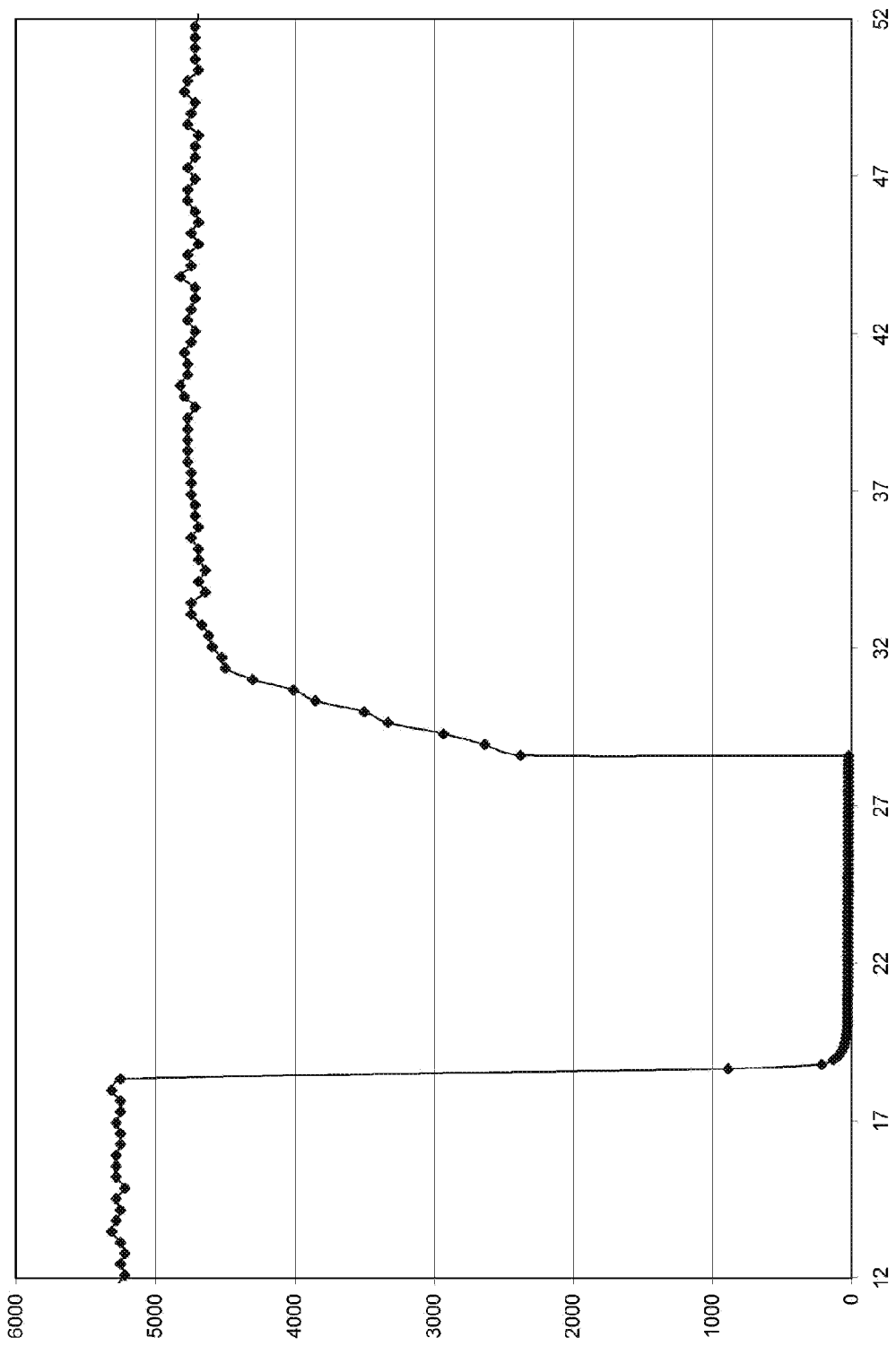
FIG. 6 presents test results for a regained-permeability test with a fluid comprising diutan.

Two tests are performed according to the procedure described above using two different treatment fluids. The test parameters are given in Table 2, and the test results are illustrated in FIGS. 5 and 6. In the first test, WG-37 may be used as the crosslinked xanthan test fluid. FIG. 5 shows a plot of permeability, measured in millidarcies, for increasing pore volumes over the course of the test. In the second test, 1% "FDP-S848-07," which is commercially available from Halliburton Energy Services, Inc. of Duncan, Okla., may be used as the diutan test fluid. FIG. 6 shows a plot of permeability, measured in millidarcies, for increasing pore volumes over the course of the test. In each of FIGS. 5 and 6, the near-zero permeability readings may indicate the treatment fluid stage of the test.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary slightly. Moreover, any numerical range defined by two R numbers as defined in the above is also specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
    providing at least one fracture in a subterranean formation;
    placing a clean fluid into a portion of the at least one fracture, wherein the clean fluid comprises a plurality of proppant particulates; and wherein the clean fluid is viscosified with one or more clean polymers selected from the group consisting of: a clarified polymer, a synthetic polymer, a clarified biopolymer, a clarified xanthan, a clarified diutan, a clarified hydroxyethylcellulose, a succinoglycan, a clarified scleroglucan, and a derivative thereof; and,
    depositing one or more of the plurality of proppant particulates into the portion of the at least one fracture to form a partial monolayer within the fracture, wherein the partial monolayer comprises a single, substantially non-contiguous layer comprising proppant particulates and flow channels between at least some of the proppant particulates; and wherein a volumetric fraction of the partial monolayer occupied by the flow channels is greater than about 50%.

2. The method of claim 1, wherein the volumetric fraction of the partial monolayer occupied by the flow channels is greater than about 60%.

3. The method of claim 1, wherein the clean fluid does not produce a substantial amount of filter cake in the subterranean formation.

4. The method of claim 3, wherein the clean fluid further comprises a gas.

5. The method of claim 1, wherein the step of placing the clean fluid into a portion of the at least one fracture is done at a pressure above the fracture gradient of the subterranean formation.

6. The method of claim 1, wherein the clean fluid comprises a micro-crosslinked gel.

7. The method of claim 1, wherein the clean fluid produces a self-cleaning filter cake in the subterranean formation.

8. The method of claim 1, wherein the clean fluid further comprises a volatile hydrocarbon fluid.

9. The method of claim 1, wherein the clean fluid further comprises a compound selected from the group consisting of: an ester, an orthoester, and a derivative thereof.

10. The method of claim 1, wherein the clean fluid further comprises a fluid selected from the group consisting of: a foam, an emulsion, a viscoelastic surfactant gel, and a derivative thereof.

11. The method of claim 1, wherein the clean fluid further comprises a degradable fluid loss additive.

12. The method of claim 1, wherein at least a portion of the plurality of proppant particulates are deformable.

13. The method of claim 1, wherein at least a portion of the plurality of proppant particulates are formed from a degradable material.

14. The method of claim 1, wherein the volumetric concentration of the plurality of proppant particulates in the clean fluid is between about 0.005 lb/gal and 1.0 lb/gal.

15. The method of claim 1, wherein the volumetric fraction of the partial monolayer occupied by the flow channels is between about 50% and about 60%.

16. A method comprising:
    providing a pumping schedule for treating a subterranean formation, wherein the pumping schedule is determined by:

providing conductivity test data for the subterranean formation;

providing a monolayer in situ proppant concentration;

identifying at least one point of maximum conductivity in the conductivity test data below the monolayer in situ proppant concentration;

identifying a target in situ proppant concentration which correlates with the at least one point of maximum conductivity; and identifying a pumping schedule to provide the target in situ proppant concentration to a desired location in the subterranean formation; and placing a clean fluid into the subterranean formation to form a partial monolayer therein, wherein:

the clean fluid comprises a plurality of proppant particulates and is viscosified with one or more clean polymers selected from a group consisting of: a clarified polymer, a synthetic polymer, a clarified biopolymer, a clarified xanthan, a clarified diutan, a clarified hydroxyethylcellulose, a succinoglycan, a clarified scleroglucan, and a derivative thereof;

the volume of the clean fluid placed into the subterranean formation and the volumetric concentration of the plurality of proppant particulates in the clean fluid correlates to the pumping schedule; and the partial monolayer comprises a single, substantially non-contiguous layer comprising proppant particulates.

17. The method of claim 16, wherein the step of placing the clean fluid into the subterranean formation is done at a pressure above the fracture gradient of the subterranean formation.

18. A method comprising:

providing a monolayer in situ proppant concentration and conductivity test data related to that monolayer;

identifying at least one point of maximum conductivity in the conductivity test data below the monolayer in situ proppant concentration;

providing at least one fracture in a subterranean formation;

placing a fluid into a portion of the at least one fracture, wherein the fluid is viscosified with one or more clean polymers selected from a group consisting of: a clarified polymer, a synthetic polymer, a clarified biopolymer, a clarified xanthan, a clarified diutan, a clarified hydroxyethylcellulose, a succinoglycan, a clarified scleroglucan, and a derivative thereof and comprises:

a plurality of proppant particulates; and a degradable fluid loss additive, wherein the degradable fluid loss additive comprises collagen; and depositing one or more of the plurality of proppant particulates into the portion of the at least one fracture.

19. The method of claim 18, wherein the step of placing the fluid into a portion of the at least one fracture is done at a pressure above the fracture gradient of the subterranean formation.

20. A method comprising:

providing at least one fracture in a subterranean formation;

placing a clean fluid into a portion of the at least one fracture, wherein the clean fluid comprises a plurality of proppant particulates; and wherein the clean fluid is viscosified with one or more clean polymers selected from the group consisting of: a clarified polymer, a synthetic polymer, a clarified biopolymer, a clarified xanthan, a clarified diutan, a clarified hydroxyethylcellulose, a succinoglycan, a clarified scleroglucan, and a derivative thereof;

wherein at least a portion of the plurality of proppant particulates comprise a chemically degradable material; and depositing one or more of the plurality of proppant particulates into the portion of the at least one fracture to form a partial monolayer within the fracture, wherein the partial monolayer is formed from a full monolayer or a packed portion following chemical degradation of the portion of the plurality of proppant particulates comprising a chemically degradable material, and wherein the partial monolayer comprises a single, substantially non-contiguous layer of proppant particulates.

21. The method of claim 20, wherein the step of placing the clean fluid into a portion of the at least one fracture is done at a pressure above the fracture gradient of the subterranean formation.

22. The method of claim 20, wherein chemically degradable material comprises at least one material selected from the group consisting of oil-degradable materials, oil-degradable polymers, degradable polymers, dehydrated compounds, dehydrated salts, and combinations thereof.

* * * * *